United States Patent
Koizuka et al.

(10) Patent No.: US 10,233,341 B2
(45) Date of Patent: Mar. 19, 2019

(54) INK, METHOD OF MANUFACTURING INK, AND INK CARTRIDGE

(71) Applicants: Yuusuke Koizuka, Shizuoka (JP); Kazukiyo Nagai, Shizuoka (JP); Tomoyuki Shimada, Shizuoka (JP); Shigeyuki Harada, Shizuoka (JP); Akihiko Matsuyama, Shizuoka (JP); Yoshiki Yanagawa, Shizuoka (JP); Koichiro Oyama, Kanagawa (JP); Takuya Yamazaki, Shizuoka (JP); Akiyoshi Sabu, Shizuoka (JP)

(72) Inventors: Yuusuke Koizuka, Shizuoka (JP); Kazukiyo Nagai, Shizuoka (JP); Tomoyuki Shimada, Shizuoka (JP); Shigeyuki Harada, Shizuoka (JP); Akihiko Matsuyama, Shizuoka (JP); Yoshiki Yanagawa, Shizuoka (JP); Koichiro Oyama, Kanagawa (JP); Takuya Yamazaki, Shizuoka (JP); Akiyoshi Sabu, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 269 days.

(21) Appl. No.: 15/282,101

(22) Filed: Sep. 30, 2016

(65) Prior Publication Data

US 2017/0121544 A1    May 4, 2017

(30) Foreign Application Priority Data

Oct. 28, 2015    (JP) .................. 2015-211691

(51) Int. Cl.
*C09D 11/102*    (2014.01)
*C09D 11/322*    (2014.01)
*C09D 11/324*    (2014.01)

(52) U.S. Cl.
CPC .......... *C09D 11/102* (2013.01); *C09D 11/322* (2013.01); *C09D 11/324* (2013.01)

(58) Field of Classification Search
CPC ........................... C09D 11/102; C09D 11/322
See application file for complete search history.

(56) References Cited

U.S. PATENT DOCUMENTS

2012/0328854 A1    12/2012    Matsuyama et al.
2014/0072779 A1    3/2014    Matsuyama et al.
(Continued)

FOREIGN PATENT DOCUMENTS

JP    2009-299005    12/2009
JP    2011-105866    6/2011
(Continued)

*Primary Examiner* — Ling Siu Choi
*Assistant Examiner* — Thuy-Ai N Nguyen
(74) *Attorney, Agent, or Firm* — Oblon, McClelland, Maier & Neustadt, L.L.P.

(57) ABSTRACT

Ink includes water, a coloring material, and a copolymer including a first structure unit represented by the following Chemical formula 1 and a second structure unit including an anionic group.

Chemical formula 1

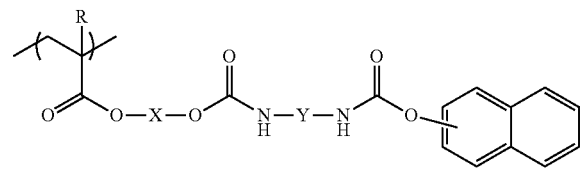

In the Chemical formula, R represents a hydrogen atom or a methyl group, X represents an alkylene group having 2-4
(Continued)

carbon atoms, and Y represents a substituted or non-substituted straight-chain alkylene group having 5 to 7 carbon atoms.

6 Claims, 1 Drawing Sheet

(56) References Cited

U.S. PATENT DOCUMENTS

| | | |
|---|---|---|
| 2014/0120331 A1 | 5/2014 | Koizuka et al. |
| 2014/0141209 A1 | 5/2014 | Koizuka et al. |
| 2014/0198160 A1 | 7/2014 | Harada et al. |
| 2014/0199530 A1 | 7/2014 | Katoh et al. |
| 2014/0242352 A1 | 8/2014 | Naruse et al. |
| 2015/0056425 A1 | 2/2015 | Nagai et al. |
| 2015/0064418 A1 | 3/2015 | Matsuyama et al. |
| 2015/0064425 A1 | 3/2015 | Matsuyama et al. |
| 2015/0109382 A1 | 4/2015 | Naruse et al. |
| 2015/0116421 A1 | 4/2015 | Nonogaki et al. |
| 2015/0125672 A1 | 5/2015 | Katoh et al. |
| 2015/0247049 A1 | 9/2015 | Matsuyama et al. |
| 2015/0252203 A1 | 9/2015 | Matsuyama et al. |
| 2015/0259555 A1 | 9/2015 | Katoh et al. |
| 2015/0291817 A1 | 10/2015 | Katoh et al. |
| 2015/0307734 A1 | 10/2015 | Nonogaki et al. |
| 2015/0376425 A1 | 12/2015 | Hakiri et al. |
| 2016/0017075 A1* | 1/2016 | Harada ............... C09D 11/107 347/86 |
| 2016/0032037 A1 | 2/2016 | Harada et al. |
| 2016/0075892 A1 | 3/2016 | Harada et al. |
| 2016/0102162 A1 | 4/2016 | Harada et al. |
| 2016/0130452 A1 | 5/2016 | Katoh et al. |
| 2016/0168292 A1 | 6/2016 | Fukuoka et al. |
| 2016/0222234 A1 | 8/2016 | Matsuyama et al. |

FOREIGN PATENT DOCUMENTS

| | | |
|---|---|---|
| JP | 2012-051357 | 3/2012 |
| WO | WO2007/053563 A2 | 5/2007 |

* cited by examiner

INK, METHOD OF MANUFACTURING INK, AND INK CARTRIDGE

CROSS-REFERENCE TO RELATED APPLICATIONS

This patent application is based on and claims priority pursuant to 35 U.S.C. § 119 to Japanese Patent Application No. 2015-211691, filed on Oct. 28, 2015, in the Japan Patent Office, the entire disclosure of which is hereby incorporated by reference herein.

BACKGROUND

Technical Field

The present invention relates to ink, a method of manufacturing ink, and an ink cartridge.

Description of the Related Art

Inkjet recording methods have advantages such that the process is simple and full colorization is easy in comparison with other recording methods. Therefore, high resolution images can be obtained by a device having a simple configuration. For this reason, inkjet recording is widely diffusing from home use to office use, commercial printing, and industrial printing. However, aqueous ink using a water-soluble dye as the coloring material used in inkjet recording methods is inferior with regard to water resistance and light resistance. Therefore, pigment ink using a water insoluble pigment is under development.

For inkjet ink printing for office use, recording media, typically plain paper, are used and high image density is demanded. In general, when images are printed on plain paper using pigment ink, the pigment ink does not stay on the surface of the paper but permeates into the paper, so that the density of the pigment on the surface decreases and consequently the image density lowers. Image density increases if concentration of pigments in the ink is increased. However, the ink becomes viscous, thereby degrading the discharging stability of the ink.

Moreover, water contained in the pigment ink swells the surface of plain paper immediately after the ink droplets land on the paper. As a result, the extension percentage differs between the top surface and the bottom surface of the paper, which causes the paper to curl. This phenomenon does not cause a problem during low performance. However, as the printing speed increases, recording media are transferred (conveyed) before curling is canceled after printing, which naturally leads to occurrence of paper jam. To prevent this paper jam, it is suitable to add a permeating agent to a pigment ink to promote water to permeate into paper. However, ink becomes hydrophobic by the agent, which makes it difficult to secure storage stability of the ink. Also, the pigment ink more easily permeates into a recording medium, thereby furthermore decreasing image density.

SUMMARY

According to the present invention, provided is an improved ink which includes water, a coloring material, and a copolymer including a first structure unit represented by the following Chemical formula 1 and a second structure unit including an anionic group.

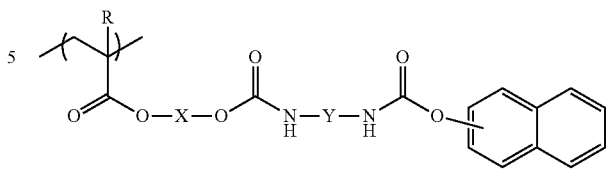

Chemical formula 1

In the Chemical formula, R represents a hydrogen atom or a methyl group, X represents an alkylene group having 2-4 carbon atoms, and Y represents a substituted or non-substituted straight-chain alkylene group having 5-7 carbon atoms.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

Figure 1:
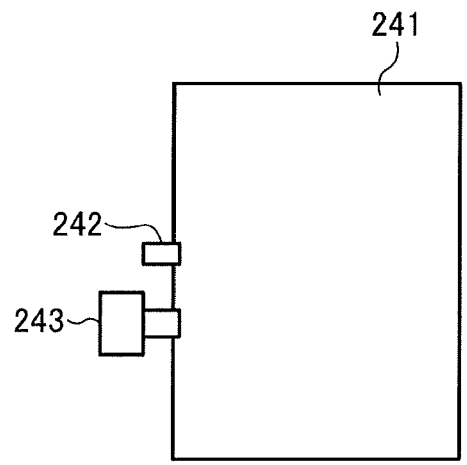
FIG. 1 is a schematic diagram illustrating an example of an ink cartridge according to an embodiment of the present disclosure.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Embodiment 1 of the present disclosure is ink which includes water, a coloring material, and a copolymer including a first structure unit represented by the following Chemical formula 1 and a second structure unit including an anionic group.

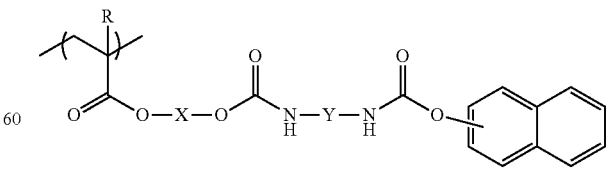

Chemical formula 1

In Chemical formula 1, R represents a hydrogen atom or a methyl group, X represents an alkylene group having 2-4 carbon atoms, and Y represents a substituted or non-substituted straight-chain alkylene group having 5-7 carbon atoms.

Embodiment 1 as one aspect of the present disclosure is described in detail. Since the following embodiments 2-6 are included in the present disclosure, these are also described.

2. The ink according to 1 mentioned above, wherein the second structure unit includes a carboxylic group.

3. The ink according to 1 or 2 mentioned above, wherein the proportion of the first structure unit in the copolymer is 75-90 percent by mass.

4. The ink according to any one of 1-3, wherein the mass average molecular weight of the copolymer is 15,000-40,000.

5. A method of manufacturing ink including water, a coloring material, and a copolymer, including synthesizing the copolymer by radical polymerization of a monomer mixture including a monomer represented by the following Chemical formula 2 and a monomer including an anionic group and mixing the copolymer, the coloring material and the water.

In the Chemical formula 2, R represents a hydrogen atom or a methyl group, X represents an alkylene group having 2-4 carbon atoms and Y represents a substituted or non-substituted alkylene group having 5-7 carbon atoms.

6. An ink cartridge including the ink of any one of 1-4 and a container to accommodate the ink of any one of 1-4.

Copolymer

The copolymer for use in the present disclosure includes the first structure unit represented by the following Chemical formula 1 and the second structure unit including an anionic group.

Structure Units Represented by Chemical Formula 1

In the Chemical formula 1, Y represents a substituted or non-substituted straight-chain alkylene group having 5-7 carbon atoms. Specific examples of the substituents include, but are not limited to, methyl group, methoxy carbonyl group, halogen, and a functional group having halogen.

Specific examples of the structure unit represented by the Chemical formula 1 are illustrated below but are not limited thereto.

Chemical formula 2

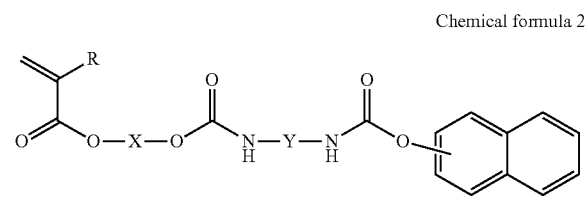

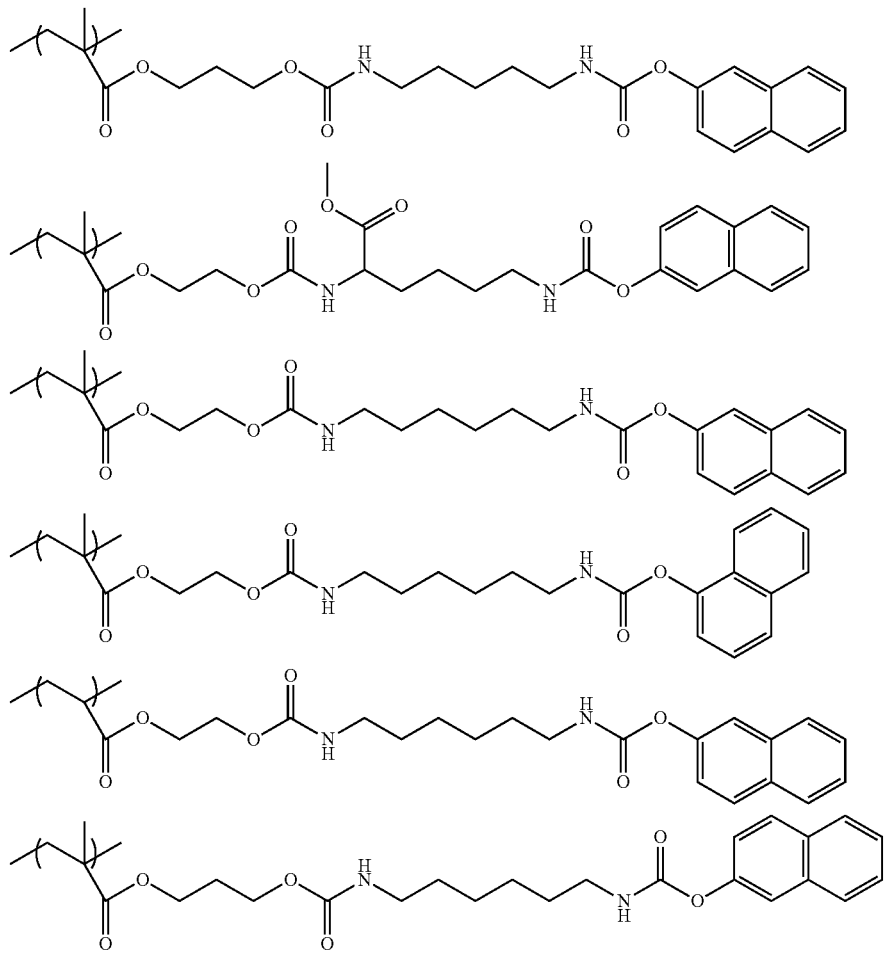

-continued

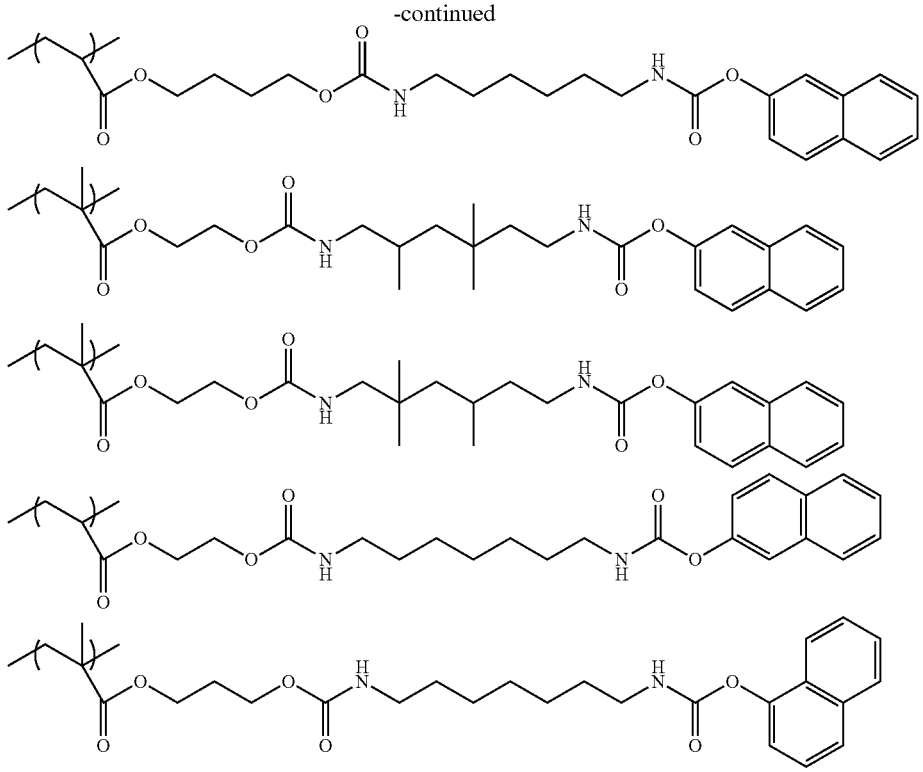

The naphtyl group present at the distal end via Y has an excellent pigment adsorption power due to π-π stacking with pigments serving as the coloring material in the ink. When a pigment dispersion in which a pigment is dispersed in water is prepared using the copolymer mentioned above, adsorption power with the pigment is strong. As a result, dispersion stability is enhanced and the thus-obtained dispersion has good storage stability. Moreover, when a hydrophilic organic solvent is added to ink, dispersibility is maintained so that the obtained dispersion has good storage stability.

In addition, when the copolymer mentioned above is used for ink, the density of images recorded on plain paper becomes high. This mechanism is not clear but can be inferred as follows.

In ink using the copolymer mentioned above, pigments have good dispersion stability so that coarse particles are not easily formed when the ink is attached to the surface of plain paper. If coarse particles are formed, exposed portions where no pigment is attached to the surface of plain paper tend to appear. As a result, image density lowers. To the contrary, ink using the copolymer mentioned above can uniformly cover the surface of plain paper so that high image density is obtained.

Structure Units Having Anionic Group

The structure unit having an anionic group is formed by copolymerization of monomers having anionic groups. Examples of the monomer having an anionic group are unsaturated carboxylic acid monomers, unsaturated sulfonic acid monomers, and unsaturated phosphoric acid monomers.

Specific examples of the unsaturated carboxylic acid monomers include, but are not limited to, acrylic acid, methacrylic acid, itaconic acid, fumaric acid, and maleic acid.

Specific examples of unsaturated sulfonic acid monomers include, but are not limited to, styrene sulfonic acid, 2-acrylamide-2-methyl propane sulfonic acid.

Specific examples of unsaturated phosphoric acid monomers include, but are not limited to, vinyl phosphoric acid, vinyl phosphate, bis(methcryloxyethyl)phosphate, diphenyl-2-acryloyloxy ethylphosphate, disphenyl-2-methacryloyloxy ethylphosphate, and dibutyl-2-acryloyloxy ethylphosphate.

Of these, monomers having carboxyl groups are preferable and avrylic acid and methacrylic acid are more preferable, Examples of the structure unit having an anionic group are as follows but are not limited thereto.

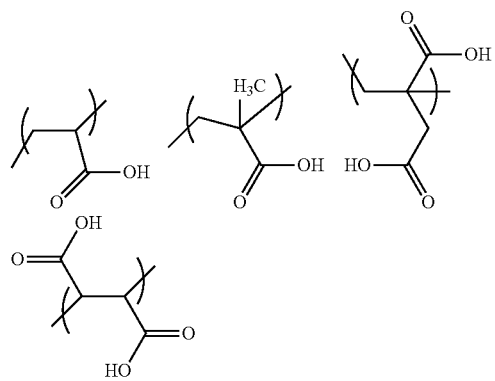

The monomer having an anionic group can be used alone or in combination. The structure unit having an anionic group may be neutralized by a base.

Specific examples of the base include, but are not limited to, sodium hydroxide, potassium hydroxide, lithium hydroxide, tetramethyl ammonium hydroxide, tetraethyl ammonium hydroxide, tetrapropyl ammonium hydroxide, tetrabutyl ammonium hydroxide, tetrapentyl ammonium hydroxide, tetrahexyl ammonium hydroxide, triethylmethyl ammonium hydroxide, tributylmethyl ammonium hydroxide, trioctylmethyl ammonium hydroxide, 2-hydroxyethyl trimethyl ammonium hydroxide, tris(2-hydroxyethyl) methyl ammonium hydroxide, propyltrimethyl ammonium hydroxide, hexyltrimethyl ammonium hydroxide, octyltrimethyl ammonium hydroxide, nonyltrimethyl ammonium hydroxide, decyltrimethyl ammonium hydroxide, dodecyltrimerthyl ammonium hydroxide, tetradecyltrimethyl ammonium hydroxide, hexadecyl trimethyl ammonium hydroxide, octadecyl trimethyl ammonium hydroxide, didodecyl dimethyl ammonium hydroxide, ditetradecyl dimethyl ammonium hydroxide, dihexyadecyl dimethyl ammonium hydroxide, dioctadecyl dimethyl ammonium hydroxide, ethylhexadecyl dimethyl ammonium hydroxide, ammonium water, dimethyl amine, trimethyl amine, monoethyl amine, diethyl amine, triethyl amine, monoethanol amine, diethanol amine, triethanol amine, methyl ethanol amine, methyldiethanol amine, dimethylethanol amine, monopropanol amine, dipropanol amine, tripropanol amine, isopropanol amine, morpholine, N-methyl morpholine, N-methyl-2-pyrolidone, and 2-pyrolidone.

These bases serving as neutralizing agents can be used alone or in combination.

Neutralizing treatment can be conducted when the monomer having an anionic group is co-polymerized or when dissolving the copolymer.

Composition Ratio

The proportion of the structure unit represented by the Chemical formula 1 is not particularly limited and can be suitably determined to suit to a particular application. The proportion is preferably 60-90 percent and more preferably 75-90 percent by mass to the total amount of the copolymer mentioned above. When the proportion is within this range, a high image density and good storage stability are obtained when used for ink, which is advantageous.

Molecular Weight

The mass average molecular weight of the copolymer is preferably 5,000-50,000 and more preferably 15,000-40,000 in polystyrene conversion. When the mass average molecular weight is within this range, a high image density and good storage stability are obtained when used for ink, which is advantageous.

Other Monomers

The copolymer mentioned above may furthermore optionally include a structure unit formed of other polymerizable monomers in addition to the structure unit represented by the Chemical formula 1 and the structure unit having an anionic group.

Such other polymerizable monomers are not particularly limited. These can be selected to suit to a particular application. Examples thereof are polymerizable hydrophobic monomers, polymerizable hydrophilic monomers, and polymerizable surfactants.

Specific examples of the polymerizable hydrophobic monomer include, but are not limited to, unsaturated ethylene monomers having aromatic ring such as styrene, α-methyl styrene, 4-t-butyl styrene, and 4-chloromethyl styrene; (meth)acrlic acid alkyl such as methyl (meth) acrylate, ethyl(meth)acrylate, (meth)acrylic acid-n-butyl, dimethyl maleate, dimethyl itaconate, dimethyl fumarate, lauryl(meth)acrylate (C12), tridecyl(meth)acrylate (C13), tetradecyl(meth)acrylate (C14), pentadecyl(meth)acrylate (C15), hexadecyl(meth)acrylate (C16), heptadecyl(meth) acrylate (C17), nonadecyl(meth)acrylate (C19), eicosyl (meth)acrylate (C20), heneicosyl(meth)acrylate (C21), and docosyl(meth)acrylate (C22); and unsaturated ethylene monomers having an alkyl group such as 1-heptene, 3,3-dimethyl-1-pentene, 4,4-dimethyl-1-pentene, 3-methyl-1-hexene, 4-methyl-1-hexene, 5-methyl-1-hexene, 1-octene, 3,3-dimethyl-1-hexene, 3,4-diemthyl-1-hexene, 4,4-diemthyl-1-hexene, 1-nonene, 3,5,5-trimethyl-1-hexene, 1-decene, 1-undecene, 1-dodecene, 1-tridecene, 1-tetracene, 1-pentadecene, 1-hexadecene, 1-heptadecene, 1-octadecene, 1-nonadecene, 1-eicocene, and 1-dococene. These can be used alone or in combination.

Specific examples of the polymerizable hydrophilic monomers include, but are not limited to, nonionic unsaturated ethylene monomers such as (meth)acrylic acid-2-hydroxyethyl, diethylene glycol mono(meth)acrylate, triethylene glycol mono(meth)acrylate, tetraethylene glycol mono (meth)acrylate, polyethylene glycol mono(meth)acrylate, (meth)acrylamide, N-methylol(meth)acrylamide, N-vinyl formamide, N-vinylacetoamide, N-vinylpyrolidone, acrylamide, N,N-dimethyl acrylamide, N-t-butyl acrylamide, N-octyl acrylamide, and N-t-octyl acrylamide.

One or more kinds of the polymerizable hydrophilic monomers and polymerizable hydrophobic monomers are mixed and the proportion of the mixture is 5-100 percent by mass of the total of the monomer forming the structure unit represented by the Chemical formula 1 and the monomer forming the structure unit having an anionic group.

Synthesis of Copolymer

The copolymer can be obtained by co-polymerizing the monomer represented by the Chemical formula 2 and the monomer having an anionic group under the presence of a radical polymerization initiator.

In the Chemical formula 2, Y represents a substituted or non-substituted straight-chain alkylene group having 5-7 carbon atoms.

Specific examples of the substituents include, but are not limited to, methyl group, methoxy carbonyl group, halogen, and a functional group having halogen.

Specific examples of the monomer represented by the Chemical formula 2 are illustrated below but are not limited thereto.

(M-1)

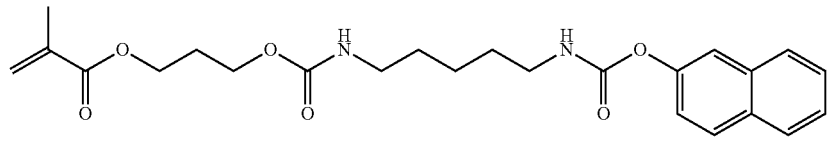

-continued
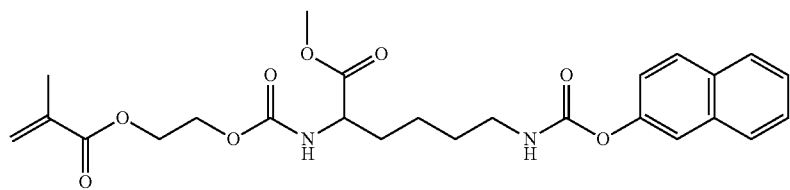
(M-2)
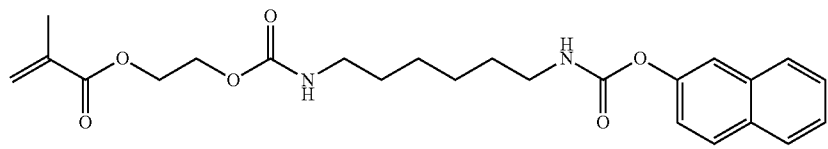
(M-3)
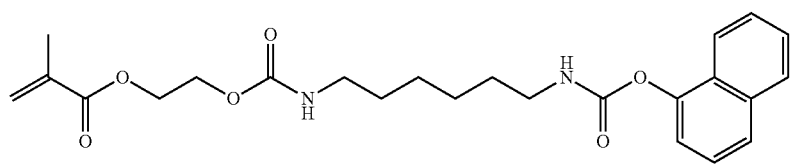
(M-4)
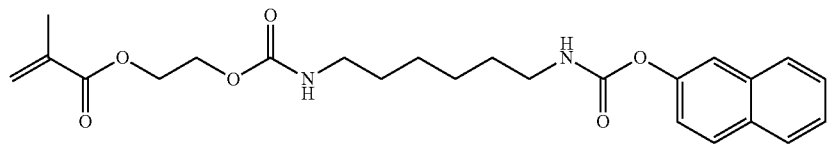
(M-5)
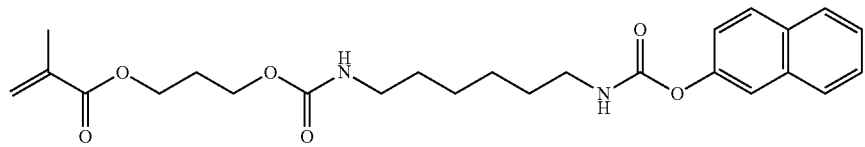
(M-6)
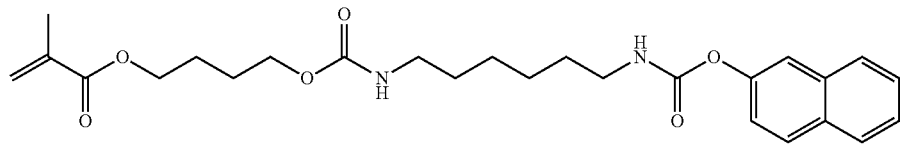
(M-7)
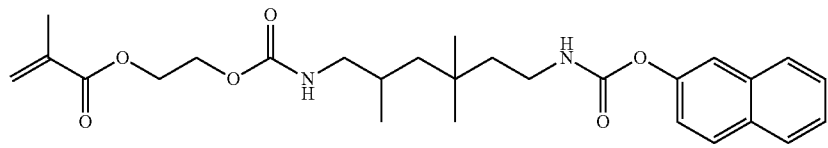
(M-8)
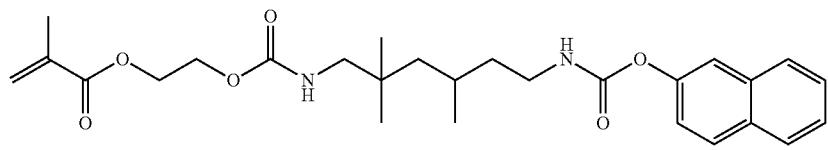
(M-9)
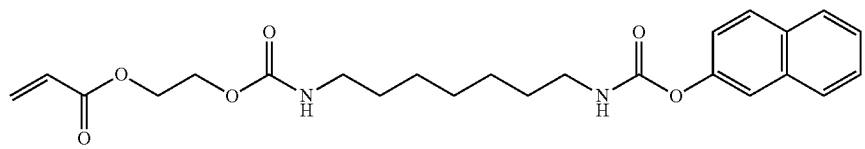
(M-10)

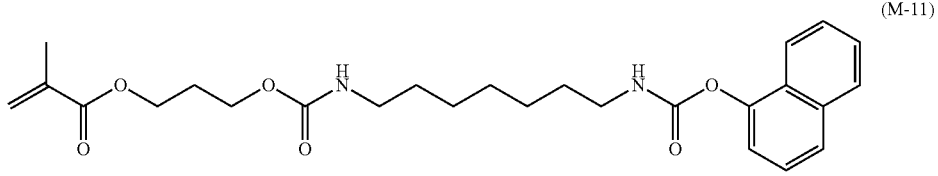

(M-11)

The monomer represented by the Chemical formula 2 can be synthesized as follows and used. As illustrated in the following reaction formulae 1 and 2, diisocyanate compound A-1 and naphthol A-2 are caused to react under the presence of an acid receptor such as amine or pyridine to obtain a reaction intermediate A-3. Thereafter, hydroxy alkyl methacrylate A-4 and A-3 are caused to react to obtain the monomer represented by the Chemical formula 2.

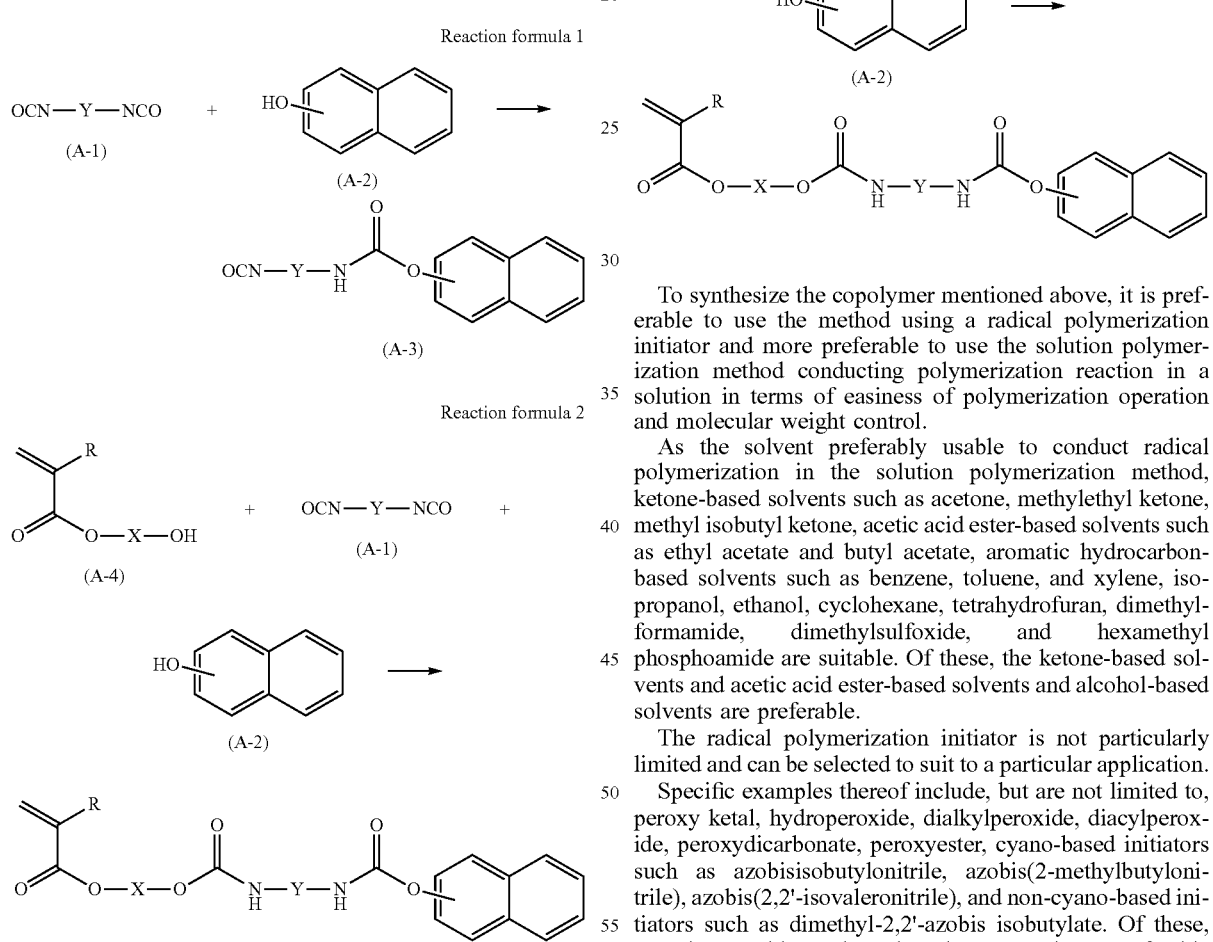

In another method, A-1 and A-4 were caused to react first and thereafter the reaction product was caused to react with A-2 to obtain the monomer represented by the Chemical formula 2.

In yet another method, as illustrated in the reaction formula 3, the diisocyanate compound A-1, naphthol A-2, and hydroxy alkyl methacrylate A-4 were caused to react to obtain the monomer represented by the Chemical formula 2.

To synthesize the copolymer mentioned above, it is preferable to use the method using a radical polymerization initiator and more preferable to use the solution polymerization method conducting polymerization reaction in a solution in terms of easiness of polymerization operation and molecular weight control.

As the solvent preferably usable to conduct radical polymerization in the solution polymerization method, ketone-based solvents such as acetone, methylethyl ketone, methyl isobutyl ketone, acetic acid ester-based solvents such as ethyl acetate and butyl acetate, aromatic hydrocarbon-based solvents such as benzene, toluene, and xylene, isopropanol, ethanol, cyclohexane, tetrahydrofuran, dimethylformamide, dimethylsulfoxide, and hexamethyl phosphoamide are suitable. Of these, the ketone-based solvents and acetic acid ester-based solvents and alcohol-based solvents are preferable.

The radical polymerization initiator is not particularly limited and can be selected to suit to a particular application. Specific examples thereof include, but are not limited to, peroxy ketal, hydroperoxide, dialkylperoxide, diacylperoxide, peroxydicarbonate, peroxyester, cyano-based initiators such as azobisisobutylonitrile, azobis(2-methylbutylonitrile), azobis(2,2'-isovaleronitrile), and non-cyano-based initiators such as dimethyl-2,2'-azobis isobutylate. Of these, organic peroxides and azo-based compounds are preferable and azo compounds are particularly preferable in terms of easiness of molecular weight control and low dissolution temperature.

In addition, the content of the radical polymerization initiator is not particularly limited and can be determined to a particular application. The proportion thereof is preferably 1-10 percent by mass based on the total amount of the polymerizable monomer.

To control the molecular weight of the copolymer mentioned above, a chain transfer agent may be optionally added.

Specific examples of the chain transfer agents include, but are not limited to, mercapto acetate, mercapto propionate, 2-propane thiol, 2-meracapto ethanol, thiophenol, dodecyl mercaptane, 1-dodecane thiol, and thioglycerol.

The polymerization temperature is not particularly limited and can be selected to suit to a particular application. It is preferably 50-150 degrees C. and more preferably 60-100 degrees C. The polymerization time is not particularly limited and can be suitably selected to suit to a particular application. It is preferably 3-48 hours.

Content of Copolymer

The content of the copolymer in the ink of the present disclosure has no particular limit and can be selected to suit to a particular application. The proportion is 0.05-10 percent by mass and more preferably 0.3-5 percent by mass in solid portion. When the proportion is not less than 0.05 percent by mass, dispersibility and storage property are improved. When the proportion is not greater than 10 percent by mass, a suitable range of viscosity can be obtained to discharge ink from heads.

The copolymer can be used as a dispersant for a pigment and an additive for a pigment dispersion.

Usage of the copolymer as a dispersant for a pigment further improves storage stability of ink having a large proportion of a water-soluble organic solvent.

The content of the copolymer used as a pigment dispersant is not particularly limited and can be suitably selected to suit to a particular application. It is preferably 1-100 parts by mass and more preferably 5-80 parts by mass to 100 parts by mass of a pigment. When the content is within this preferable range, a high image density and good storage stability are obtained, which is advantageous.

Water

As the water for use in the ink of the present disclosure, for example, pure water and ultra pure water such as deionized water, ultrafiltered water, reverse osmosis water, and distilled water are suitable.

The content of water in the ink has no particular limit and can be suitably selected to suit to a particular application. In terms of drying property and discharging reliability of the ink, the proportion is preferably 10-90 percent by mass and more preferably 20-60 percent by mass.

Coloring Material

Both pigments and dyes can be used as the coloring material for the ink of the present disclosure. However, when it comes to the adsorption power of the copolymer mentioned above to the coloring material, pigments are superior to dyes. Moreover, pigments are preferable in terms of water resistance and light resistance.

Pigment

The pigments are not particularly limited. These can be selected to suit to a particular application. For example, inorganic pigments or organic pigments for black or color are suitable. These can be used alone or in combination.

The content of the pigment in ink is not particularly limited and can be suitably selected to suit to a particular application. The proportion is preferably 0.5-20 percent by mass and more preferably 1-10 percent by mass.

Inorganic Pigment

Specific examples of the inorganic pigments include, but are not limited to, titanium oxide, iron oxide, calcium oxide, barium sulfate, aluminum hydroxide, barium yellow, cadmium red, chrome yellow, and carbon black.

Specific examples of the pigments for black color include, but are not limited to, carbon black (C.I. Pigment Black 7) such as furnace black, lamp black, acetylene black, and channel black, metals such as copper and iron (C.I. Pigment Black 11), and metal oxides such as titanium oxides, and organic pigments such as aniline black (C.I. Pigment Black 1).

Of various carbon blacks, it is suitable to use carbon black manufactured by a furnace method or channel method and having a primary particle diameter of 15 nm-40 nm, a specific surface area of 50-300 $m^2/g$ according to Brunauer-Emmett-Teller (BET) method, a dibutylphthalate (DPB) absorption oil amount of 40-150 ml/100 g, a volatile content of from 0.5-10 percent, and pH of 2-9.

Organic Pigment

Specific examples of the organic pigments include, but are not limited to, azo pigments (azo lakes, insoluble azo pigments, condensed azo pigments, chelate azo pigments, etc.), polycyclic pigments (phthalocyanine pigments, perylene pigments, perinone pigments, anthraquinone pigments, quinacridone pigments, dioxazine pigments, indigo pigments, thioindigo pigments, isoindolinone pigments, and quinofuranone pigments, etc.), dye chelates (basic dye type chelate, acid dye type chelate), nitro pigments, nitroso pigments, and aniline black.

Of these pigments, pigments having good affinity with water are preferable in particular.

Specific examples of the azo pigments include, but are not limited to, azo lake, insoluble azo pigments, condensation azo pigments, and chelate azo pigments.

Specific examples of the polycyclic pigments include, but are not limited to, phthalocyanine pigments, perylene pigments, perinone pigments, anthraquinone pigments, quinacridone pigments, dioxazine pigments, indigo pigments, thioindigo pigments, isoindolinone pigments, quinofuranone pigments, and, Rhodamine B lake pigments.

The dye chelate includes, but are not limited to, basic dye type chelate, and acidic dye type chelate.

The pigment for yellow is not particularly limited and can be selected to a particular application.

Specific examples thereof include, but are not limited to, C.I. Pigment Yellow 1, C.I. Pigment Yellow 2, C.I. Pigment Yellow 3, C.I. Pigment Yellow 12, C.I. Pigment Yellow 13, C.I. Pigment Yellow 14, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 114, C.I. Pigment Yellow 120, C.I. Pigment Yellow 128, C.I. Pigment Yellow 129, C.I. Pigment Yellow 138, C.I. Pigment Yellow 150, C.I. Pigment Yellow 151, C.I. Pigment Yellow 154, C.I. Pigment Yellow 155, C.I. Pigment Yellow 174, and C.I. Pigment Yellow 180.

The pigment for magenta is not particularly limited and can be selected to a particular application.

Specific examples thereof include, but are not limited to, C.I. Pigment Red 5, C.I. Pigment Red 7, C.I. Pigment Red 12, C.I. Pigment Red 48 (Ca), C.I. Pigment Red 48 (Mn), C.I. Pigment Red 57 (Ca), C.I. Pigment Red 57:1, C.I. Pigment Red 112, C.I. Pigment Red 122, C.I. Pigment Red 123, C.I. Pigment Red 146, C.I. Pigment Red 168, C.I. Pigment Red 176, C.I. Pigment Red 184, C.I. Pigment Red 185, C.I. Pigment Red 202, and C.I. Pigment Violet 19.

The pigment for cyan is not particularly limited and can be selected to suit to a particular application.

Specific examples thereof include, but are not limited to, C.I. Pigment Blue 1, C.I. Pigment Blue 2, C.I. Pigment Blue 3, C.I. Pigment Blue 15, C.I. Pigment Blue 15:3, C.I. Pigment Blue 15:4, C.I. Pigment Blue 15:34, C.I. Pigment Blue 16, C.I. Pigment Blue 22, C.I. Pigment Blue 60, C.I.

Pigment Blue 63, C.I. Pigment Blue 66, C.I. Pigment Pat Blue 4, and C.I. Pigment Pat Blue 60.

By using C.I. Pigment Yellow 74 as yellow pigment, C.I. Pigment Red 122 and C.I. Pigment Violet 19 as magenta pigment, and C.I. Pigment Blue 15:3 as cyan pigment, a well-balanced ink having excellent color tone and light resistance is obtained.

Self-Dispersible Pigment

The pigment for use in the present disclosure can be newly manufactured for the present disclosure.

In addition, in terms of coloring of obtained images, it is suitable to use a self-dispersible pigment and preferable to use an anionic self-dispersible pigment. The anionic self-dispersible pigment is formed by introducing an anionic functional group to the surface of a pigment directly or via another atom group to stabilize dispersion.

As the pigment before dispersion is stabilized, variety of conventional pigments can be used.

In the anionic functional group, more than a half of hydrogen ions are dissociated at pH 7.0.

Specific examples of the anionic functional groups include, but are not limited to, a carboxyl group, a sulfo group, and a phosphonic acid group. Of these, to improve optical density of obtained images, a carboxyl group or a phosphonic acid group is preferable.

An anionic functional group is introduced into the surface of a pigment by, for example, oxidation treatment of carbon black.

As the oxidization treatment, for example, hypochlorite, ozone water, hydrogen peroxide, chlorite, or nitric acid are used. Alternatively, surface treatment is suitable using a diazonium salt.

In addition, specific examples of the commercially available pigment having a surface into which a hydrophilic group is introduced include, but are not limited to, CW-1, CW-2, and CW-3 (all manufactured by Orient Chemical Industries Co., Ltd.), and CAB-O-JET200, CAB-O-JET300, and CAB-O-JET400 (all manufactured by Cabot Corporation).

The ink of the present disclosure can be produced by, for example, dispersing or dissolving, in an aqueous medium, water, a pigment, a water-soluble organic solvent, a coloring material, the copolymer mentioned above, and optional other components followed by stirring and mixing. However, the producing method is not particularly limited. The copolymer may be used as a pigment dispersing resin when preparing a pigment dispersion.

This dispersion is conducted by a sand mill, a homogenizer, a ball mill, a paint shaker, an ultrasonic dispersing agent, etc. The stirring and mixing can be conducted by a stirrer having a typical stirring wing, a magnetic stirrer, a high speed dispersing device, etc.

As for the production, coarse particles are preferably filtered with a filter, a centrifuge, etc. followed by degassing.

Dyes

As the dye mentioned above, dyes classified into acidic dyes, direct dyes, basic dyes, reactive dyes, and food dyes in the color index can be used.

Specific examples of the acid dyes and food dyes include, but are not limited to, C.I. Acid Black 1, 2, 7, 24, 26, and 94, C.I. Acid Yellow 17, 23, 42, 44, 79, and 142, C.I. Acid Blue 9, 29, 45, 92, and 249, C.I. Acid Red 1, 8, 13, 14, 18, 26, 27, 35, 37, 42, 52, 82, 87, 89, 92, 97, 106, 111, 114, 115, 134, 186, 249, 254, and 289, C.I. Food Black 1 and 2, C.I. Food Yellow 3 and 4, and C.I. Food Red 7, 9, and 14.

Specific examples of the direct dyes include, but are not limited to, C. I. Direct Black 19, 22, 32, 38, 51, 56, 71, 74, 75, 77, 154, (168), and 171, C.I. Direct Yellow 1, 12, 24, 26, 33, 44, 50, 86, 120, 132, 142, and 144, C.I. Direct Blue 1, 2, 6, 15, 22, 25, 71, 76, 79, 86, 87, 90, 98, 163, 165, 199, and 202, C.I. Direct Red 1, 4, 9, 13, 17, 20, 28, 31, 39, 80, 81, 83, 89, 225, and 227, and C.I. Direct Orange 26, 29, 62, and 102.

Specific examples of the basic dyes include, but are not limited to, C.I. Basic Black 2 and 8, C.I. Basic Yellow 1, 2, 11, 13, 14, 15, 19, 21, 23, 24, 25, 28, 29, 32, 36, 40, 41, 45, 49, 51, 53, 63, 64, 65, 67, 70, 73, 77, 87, and 91, C.I. Basic Blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147, and 155, and C.I. Basic Red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109, and 112.

Specific examples of the reactive dyes include, but are not limited to, C.I. Reactive Black 3, 4, 7, 11, 12, and 17, C.I. Reactive Yellow 1, 5, 11, 13, 14, 20, 21, 22, 25, 40, 47, 51, 55, 65, and 67, C.I. Reactive Blue 1, 2, 7, 14, 15, 23, 32, 35, 38, 41, 63, 80, and 95, and C.I. Reactive Red 1, 14, 17, 25, 26, 32, 37, 44, 46, 55, 60, 66, 74, 79, 96, and 97.

Water-Soluble Organic Solvent

The water-soluble organic solvent for use in the ink of the present disclosure has an impact as a humectant to prevent dying of ink and/or as a permeating agent.

The water-soluble organic solvent has no particular limit and can be selected to suit to a particular application. Specific examples thereof include, but are not limited to, polyhydric alcohols such as ethylene glycol, diethylene glycol, triethylene glycol, tetraethylene glycol, polyethylene glycol, propylene glycol, dipropylene glycol, tripropylene glycol, polypropylene glycol, 1,3-butanediol, 3-methyl-1,3-butanediol, 1,5-pentane diol, 1,6-hexanediol, glycerine, isopropylidene glycerol, trimethylolethane, trimethylolpropane, 1,2,4-butanetriol, 1,2,3-butanetriol, 1,2,6-hexane triol, and petriol; polyhydric alcohol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; polyhydric alcohol aryl ethers such as ethylene glycol monophenyl ether and ethylene glycol monobenzyl ether; nitrogen-containing heterocyclic compounds such as 2-pyrrolidone, N-methyl-2-pyrrolidone, N-hydroxyethyl-2-pyrrolidone, 1,3-dimethylimidazolidinone, ε-caprolactam, and γ-butyrolactone; amides such as formamide, N-methylformamide, N,N-dimethylformamide, N,N-dimethyl-β-methoxy propionamide, and N,N-dimethyl-β-buthoxy propionamide; amines such as monoethanolamine, diethanolamine, triethanolamine, monoethylamine, diethylamine, and triethylamine; sulfur-containing compounds such as dimethyl sulfoxide, sulfolane, and thiodiethanol; 3-ethyl-3-hydroxymethyloxetane, propylene carbonate, and ethylene carbonate. These can be used alone or in combination.

Of these, in terms of prevention of curling of plain paper, particularly preferable are 3-ethyl-3-hydroxymethyloxetane, isopropylidene glycerol, N,N-dimethyl-β-methoxy propionamide, and N,N-dimethyl-β-buthoxy propionamide.

Of these, 1,3-butane diol, diethylene glycol, 2,2,4-trimethyl-1,3-pentanediol, triethylene glycol, and glycerin have a good impact on prevention of defective discharging ascribable to moisture evaporation.

Specific examples of the water-soluble organic solvents having permeation property and relatively low level of wettability include, but are not limited to, 2-ethyl-1,3- hexanediol [solubility: 4.2 percent (25 degrees C.)] and 2,2,4-trimethyl-1,3-pentanediol [solubility: 2.0 percent (25 degrees C.)].

Specific examples of the other polyol compounds include, but are not limited to, aliphatic diols such as 2-ethyl-2-methyl-1,3-propanediol, 3,3-dimethyl-1,2-butane diol, 2,2-diethyl-1,3-propane diol, 2-methyl-2-propyl-1,3-propane diol, 2,4-dimethyl-2,4-pentane diol, 2,5-dimethyl-2,5-hexane diol, and 5-hexene-1,2-diol.

The other permeating agent usable in combination can be any agent capable of being dissolved in ink and adjusting to desired properties and are suitably selected to suit to particular applications.

Specific examples thereof include, but are not limited to, alkyl and aryl ethers of polyols such as diethylene glycol monophenylether, ethylene glycol monophenylether, ethylene glycol monoaryl ether, diethylene glycol monobutyl ether, diethylene glycol monophenyl ether, propylene glycol monobutyl ether, and tetraethylene glycol chlorophenyl ether and lower alcohols such as ethanol.

Sugar groups can be contained as a humectant, which is not a water-soluble organic solvent.

Specific examples of the sugar groups include, but are not limited to, monosaccharides, disaccharides, oligosaccharides (including trisaccharides and tetrasaccharides), and polysaccharides.

Specific examples thereof include, but are not limited to, glucose, mannose, fructose, ribose, xylose, arabinose, galactose, maltose, cellobiose, lactose, saccharose, trehalose, and maltotriose.

Polysaccharides represent sugar in a broad sense and contain materials that are present widely in nature, for example, α-cyclodextrine and cellulose.

In addition, specific examples of derivatives of these sugar groups include, but are not limited to, reducing sugars (for example, sugar alcohols (represented by $HOCH_2(CHOH)_nCH_2OH$, where "n" represents an integer of 2-5) of the sugar groups specified above, oxidized sugars (e.g., aldonic acid and uronic acid), amino acid, and thio acid. Of these, sugar alcohols are preferable and specific examples thereof include, but are not limited to, maltitol and sorbit.

When ink is used as ink for inkjet recording, the ratio of the pigment and the water-soluble organic solvent has a large impact on discharging stability of the ink discharged from a head. If the ratio of the water-soluble organic solvent is small while the ratio of the solid pigment portion is large, moisture evaporation around the ink meniscus of the nozzle tends to be accelerated, thereby causing defective discharging.

The content of the water-soluble organic solvent in ink has no particular limit and can be suitably selected to suit to a particular application. The proportion is preferably 10-60 percent by mass and more preferably 20-60 percent by mass. When the proportion is not less than 10 percent by mass, discharging stability of ink can be secured. When the proportion is not greater than 60 percent by mass, drying property is enhanced. When the proportion is within the preferable range, drying property and discharging reliability are extremely good.

Other Components

The other components that can be used in the ink of the present disclosure has no particular limit and can be suitably selected to suit to a particular application. For example, surfactants, pH regulators, water-dispersible resins, preservatives and fungicides, corrosion inhibitors, antioxidants, ultraviolet absorbers, oxygen absorbers, and photostabilizing agents are suitable.

Surfactant

The surfactant has no particular limit and can be suitably selected to suit to a particular application. For example, anionic surfactants, cationic surfactants, nonionic surfactants, amphoteric surfactants, and fluoro-surfactants are suitable. Of these, nonionic surfactants and fluoro-surfactants are particularly preferable.

Specific examples of the anionic surfactant include, but are not limited to, alkyl aryl sulfonic acid salts, alkyl naphthalene sulfonic acid salts, alkyl phosphoric acid salts, alkyl sulfuric acid salts, alkyl sulphonic acid salts, alkyl ether sulfuric acid salts, alkyl sulpho succinic acid salts, alkyl ester sulfuric acid salts, alkyl benzene sulfonic acid salts, alkyl diphenyl ether disulphonic acid salts, alkyl aryl ether phosphoric acid salts, alkyl aryl ether sulfuric acid salts, alkyl aryl ether ester sulfuric acid salts, olefin sulfonic acid salts, alkane olefin sulfocnic acid salts, polyoxyethylene alkyl ether phosphoric acid salts, polyoxyethylene alkyl ether sulfuric acid ester salts, ether carboxylate, sulfosuccinic acid salts, α-sulfoalicyclic acid esters, aliphatic acid salts, condensation products of a higher aliphatic acid and an amino acid, and naphthene acid salts.

Specific examples of the cationic surfactants include, but are not limited to, alkyl amine salts, dialkyl amine salts, aliphatic amine salts, benzalkonium salts, quaternary amonium salts, alkyl pyridinium salts, imidazolinium salts, sulfonium salts, and phosphonium salts.

Specific examples of the nonionic surfactants include, but are not limited to, acetylene glycol-based surfactants, polyoxyethylene alkyl ethers, polyoxyethylene alkylphenyl ethers, polyoxyethylene alkylesters, and polyoxyethylene sorbitane aliphatic acid esters.

Specific examples of the amphoteric surfactants include, but are not limited to, imidazoline derivatives such as imidazolinium betaine, dimethyl alkyl lauryl betaine, alkyl glycine, and alkyl di(aminoethyl) glycine.

As the fluorosurfactants, for example, the materials represented by Chemical formulae I, II, and III are suitable.

$$CF_3CF_2(CF_2CF_2)_mCH_2—CH_2O(CH_2CH_2O)_nH \quad \text{Chemical formula I}$$

In the Chemical formula I, a symbol "m" represents 0 and an integer of 1-10. A symbol "n" represents an integer of 1-40.

Chemical formula II

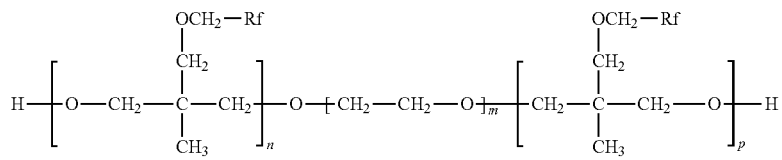

In the Chemical formula II, Rf represents a fluoro-containing group, m, n, and p each, represent integers.

As the fluoro-containing group, for example, perfluoroalkyl groups are preferable. In particular, those having 1-10 carbon atoms are preferable and those having 1-3 carbon atoms are more preferable. An example is $C_jF_{2j-1}$ (where j represents an integer of 1-10).

Specific examples thereof include, but are not limited to, $CF_3$, $CF_2CF_3$, $C_3F_7$, and $C_4F_9$. Of these, $CF_3$ and $CF_2CF_3$ are particularly preferable. In addition, it is preferable that "n" be an integer of 1-4, "m" be an integer of 6-25, and "p" be an integer of 1-4.

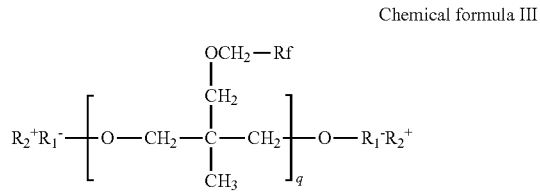

Chemical formula III

In the Chemical formula III, Rf represents a fluoro-containing group, q represents an integer.

As the fluoro-containing group, as in the case of the Chemical formula II, a perfluoroalkyl group is preferable. For example, $CF_3$, $CF_2CF_3$, $C_3F_7$, and $C_4F_9$ are suitable. $R_2^+$ represents a cation group, for example, a quaternary ammonium group, an alkali metal ion of sodium, potassium, etc., a triethyl amine and a triethanol amine are suitable. Of these, quaternary ammonium is particularly preferable. $R_1^-$ represents an anionic group, for example, $COO^-$, $SO_3^-$, $SO_4^-$, and $PO_4^-$ are suitable. "q" is preferably an integer of 1-6.

Any suitably synthesized fluoro-surfactant can be used. Products available on the market are also usable.

Specific examples of the products available on the market include, but are not limited to, SURFLON S-111, SURFLON S-112, SURFLON S-121, SURFLON S-131, SURFLON S-132, SURFLON S-141, and SURFLON S-145 (all manufactured by ASAHI GLASS CO., LTD.); FLUORAD FC-93, FC-95, FC-98, FC-129, FC-135, FC-170C, FC-430, and FC-431 (all manufactured by SUMITOMO 3M); MEGAFACE F-470, F1405, and F-474 (all manufactured by DIC CORPORATION); ZONYL TBS, FSP, FSA, FSN-100, FSN, FSO-100, FSO, FS-300 UR (all manufactured by E. I. du Pont de Nemours and Company; FT-110, FT-250, FT-251, FT-400S, FT-150, and FT-400SW (all manufactured by NEOS COMPANY LIMITED); PF-151N manufactured by OMNOVA Solutions Inc.), and UNIDYNE DSN-403N, manufactured by DAIKIN INDUSTRIES). Of these, ZONYL FS-300, FSN, FSO-100, and FSO (all manufactured by E. I. du Pont de Nemours and Company) are particularly suitable in terms of the reliability and improvement on coloring.

The content of the surfactant in ink has no particular limit and can be suitably selected to suit to a particular application. The proportion preferably 0.01-5.0 percent by mass and more preferably 0.5-3 percent by mass. When the proportion is not greater than 5.0 percent by mass, permeation into a recording medium is good, so that lowering of image density and occurrence of strike-through can be prevented.

pH Regulator

The pH regulator can be any agent capable of adjusting the pH in the range of 8.5-11 without having an adverse impact on formulated ink and suitably selected to suit to a particular application.

Specific examples thereof include, but are not limited to, alcohol amines, hydroxides of alkali metal elements, hydroxides of ammonium, phosphonium hydroxides, and alkali metal carbonates.

Specific examples of the alcohol amines include, but are not limited to, diethanol amine, triethanol amine, and 2-amino-2-ethyl-1,3-propane diol.

Specific examples of the hydroxides of alkali metal elements include, but are not limited to, lithium hydroxide, sodium hydroxide, and potassium hydroxide.

Specific examples of the hydroxides of ammonium include, but are not limited to, ammonium hydroxide and quaternary ammonium hydroxide.

A specific example of the phosphonium hydroxides is quaternary phosphonium hydroxide.

Specific examples of the alkali metal carbonates include, but are not limited to, lithium carbonate, sodium carbonate, and potassium carbonate.

Water-Dispersible Resin

The water-dispersible resin mentioned above has excellent film-forming (image forming) property, water repellency, water-resistance, and weather resistance. Therefore, these are suitable for image recording requiring good water-resistance and high image density (good coloring property).

Examples are condensation-based synthetic resins, addition-based synthetic resins, and natural polymers.

Specific examples of the condensation-based synthetic resins include, but are not limited to, polyester resins, polyurethane resins, polyepoxy resins, polyamide resins, polyether resins, poly(meth)acrylic resins, acrylic-silicone resins, and fluorine-containing resins.

Specific examples of the addition-based synthetic resins include, but are not limited to, polyolefin resins, polystyrene-based resins, polyvinyl alcohol-based resins, polyvinyl ester-based resins, polyacrylic acid-based resins, and unsaturated carboxylic acid-based resins.

Specific examples of the natural polymer include, but are not limited to, celluloses, rosins, and natural rubber.

Of these, polyurethane resin particulates, acrylic-silicone resin particulates, and fluorine-containing resin particulates are preferable.

The average particle diameter (D50) of the water-dispersible resin is related to viscosity of a liquid dispersion. If the compositions are the same, viscosity of the same solid portion increases as the particle diameter decreases.

The average particle diameter (D50) of the water-dispersible resin has no particular limit and can be suitably selected to suit to a particular application. To avoid excessively high viscosity, 50 µm or greater is preferable.

In addition, when the particle diameter is around several tens µm, it is unusable because the size is larger than the size of the nozzle of an inkjet head. If the particle size is less than the nozzle size but large particles are present in ink, discharging stability deteriorates. The average particle diameter (D50) is preferably 200 nm or less not to degrade discharging stability of ink.

In addition, preferably the water-dispersible resin has a feature of fixing the water-dispersible coloring material on paper and forms a film at room temperature, which improves fixing property of the coloring material.

Therefore, the minimum film-forming temperature (MFT) of the water-dispersible resin is preferably 30 degrees C. or lower.

In addition, when the glass transition temperature of the water-dispersible resin is −40 degrees C. or lower, viscosity of the resin film increases, thereby increasing tackiness of printed matter. Therefore, the glass transition temperature of the water-dispersible resin is preferably about −30 degrees C. or higher.

The content of the water-dispersible resin in ink has no particular limit and can be suitably selected to suit to a particular application. The proportion preferably 1-15 percent by mass and more preferably 2-7 percent by mass in solid portion.

Preservatives and Fungicides

Specific examples of the preservatives and fungicides include, but are not limited, dehydrosodium acetate, sodium sorbinate-2-pyridine thiol-1-oxide sodium, sodium benzoate, and pentachlorophenol sodium.

Corrosion Inhibitor

Specific examples of the corrosion inhibitors include, but are not limited to, acid sulfite, thiosodium sulfate, thiodiglycolate ammon, diisopropyl ammonium nitrite, pentaerythritol tetranitrate, and dicyclohexyl ammonium nitrite.

Antioxidant

Specific examples of the antioxidants include, but are not limited to, phenol-based antioxidants (including hindered phenol-based antioxidants), amino-based antioxidants, sulfur-based antioxidants, and phosphorous-based antioxidants.

Ultraviolet Absorber

Specific examples of the ultraviolet absorbers include, but are not limited to, benzophenone-based ultraviolet absorbers, benzotriazole-based ultraviolet absorbers, salicylate-based ultraviolet absorbers, cyanoacrylate-based ultraviolet absorbers, and nickel complex salt-based ultraviolet absorbers.

Use Application of Ink

The ink of the present disclosure is suitable for inkjet recording, spray-coating, relief printing plate printing, intaglio printing, stencil printing, writing materials, and stamp. In particular, the ink is suitable for inkjet recording.

Ink Cartridge

The ink cartridge of the present disclosure includes the ink mentioned above, a container to accommodate the ink, and other optional other members.

The container has no particular limit. The form, the structure, the size, and the material thereof can be suitably determined to suit to a particular application. For example, a container having an ink bag made of aluminum laminate film, a resin film, etc. is suitable. Next, the ink cartridge is described in detail with reference to FIGS. 1 and 2.

Figure 2:
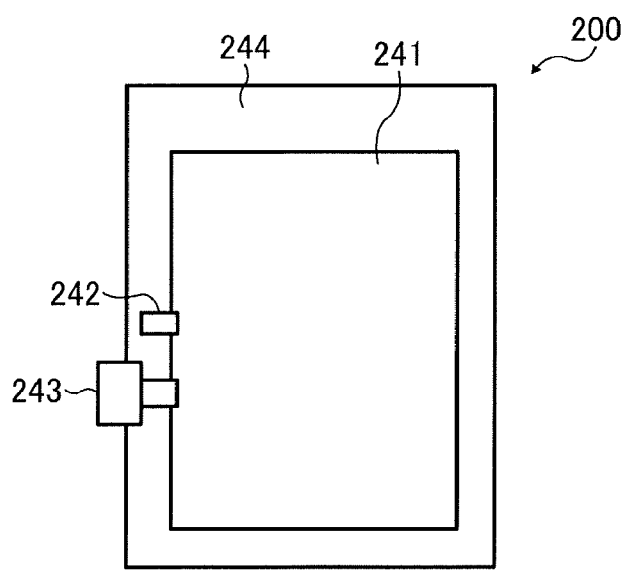
FIG. 2 is a diagram illustrating the ink cartridge illustrated in FIG. 1 including its housing.

FIG. 1 is a diagram illustrating an example of the ink cartridge. FIG. 2 is a diagram illustrating the ink cartridge illustrated in FIG. 1 including the housing thereof. In an ink cartridge 200, ink is supplied to an ink bag 241 through an ink inlet 242, the air remaining in the ink bag 241 is discharged, and thereafter the ink inlet 242 is closed by fusion. When in use, an ink outlet 243 made of rubber is pierced by the needle installed onto an inkjet recording device to supply the ink into the device. The ink bag 241 is made of a packaging material such as aluminum laminate film having no air permeability. The ink bag 241 is accommodated in a cartridge housing 244 made of plastic as illustrated in FIG. 2 and detachably attachable to various inkjet recording devices as the ink cartridge 200.

Having generally described preferred embodiments of this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples and Comparative Examples but not limited thereto. "Parts" and "percent" in Examples including Table 1 are "parts by weight" and "percent by mass" unless otherwise specified. The values in Tables 2 and 3 are also represented in parts by mass.

Measuring of Molecular Weight of Copolymer

The molecular weight of the copolymers obtained in Examples and Comparative Examples were obtained as follows:

The molecular weight of the copolymers was measured by a gel permeation chromatography (GPC) under the following conditions:

Device: GPC-8020 (manufactured by TOSOH CORPORATION)

Column: TSK G2000 HXL and G4000 HXL (manufactured by TOSOH CORPORATION)

Temperature: 40 degrees C.

Solvent: tetrahydrofuran (THF)

Flow speed: 1.0 mL/minute

Next, the number average molecular weight Mn and the mass average molecular weight Mw were calculated from the molecular weight distribution of the copolymer obtained by the measuring by using the molecular weight calibration curve obtained based on a simple dispersion polystyrene standard sample.

Synthesis Example of Copolymer

Monomer Synthesis 1: Synthesis of Monomer M-3

50.5 g (300 mmol) of hexamethylene diisocyanate and 30.4 g (300 mmol) were dissolved in 300 mL of dried toluene and the obtained solution was heated to 105 degrees C. under stirring in argon atmosphere. Next, a solution in which 43.3 g (300 mmol) of 2-naphtol was dissolved in 1,500 mL of dried toluene was slowly dripped and the resultant was stirred at 105 degrees C. for two hours. Subsequent to cooling down to room temperature and filtration of precipitates, the solvent was distilled away from the retrieved filtrate to obtain a white solid material. This material was charged in 200 mL of hexane followed by stirring at room temperature for one hour. The white solid material was filtrated to obtain 53.0 g of a reaction intermediate represented by the following Chemical formula 3.

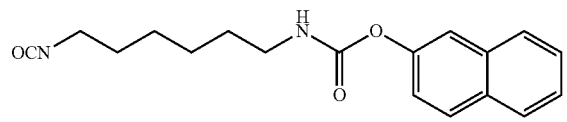

Chemical formula 3

20.8 g (160 mmol) of 2-hydroxyethyl methacrylate was dissolved in 80 mL of methylethyl ketone and stirred at room temperature in argon atmosphere. Next, 0.03 g of dibutyl tin dilaurate was dripped to the solution and heated to 50 degrees C. under stirring. Thereafter, a solution in which 50.0 g of the reaction intermediate represented by the Chemical formula 3 was dissolved in 120 mL of methylethyl ketone was slowly dripped followed by stirring at 50 degrees C. for two hours. Next, the resultant was cooled down to room temperature to filter undissolved matter and the solvent was distilled away from the filtrate to obtain a crude paste. This paste was refined by silica gel column chromatography (methylene chloride/ethylene acetate=6/1) to obtain 48.0 g of the target of monomer M-3.

Monomer Synthesis 2: Synthesis of Monomer M-5

18.6 g (160 mmol) of 2-hydroxyethyl acrylate was dissolved in 80 mL of methylethyl ketone and stirred at room temperature in argon atmosphere. Next, 0.03 g of dibutyl tin dilaurate was dripped to the solution and heated to 50 degrees C. under stirring. Thereafter, a solution in which 50.0 g of the reaction intermediate represented by the Chemical formula 3 was dissolved in 120 mL of methylethyl ketone was slowly dripped followed by stirring at 50 degrees C. for two hours. Next, the resultant was cooled down to room temperature to filter undissolved matter and the solvent was distilled away from the filtrate to obtain a crude paste. This paste was refined by silica gel column chromatography (methylene chloride/ethylene acetate=6/1) to obtain 45.9 g of the target monomer M-5.

Monomer Synthesis 3: Synthesis of Mixture of Monomer M-8 and Monomer M-9

63.1 g (300 mmol) of trimethylhexamethylene diisocyanate (2,2,4-, 2,2,4,4-, isomer mixture, manufactured by Tokyo Chemical Industry Co. Ltd.) and 30.4 g (300 mmol) of triethylamine were dissolved in 300 mL of dried toluene and the solution was heated to 105 degrees C. under stirring in argon atmosphere. Next, a solution in which 43.3 g (300 mmol) of 2-naphtol was dissolved in 1,500 mL of dried toluene was slowly dripped and the resultant was stirred at 105 degrees C. for two hours. Subsequent to cooling down to room temperature and filtration of precipitates, the solvent was distilled away from the filtrate to obtain a white solid material.

200 mL of hexane was charged to this material followed by stirring at room temperature for one hour. The white solid material was filtrated to obtain 60.5 g of a reaction intermediate mixture represented by Chemical formulas 4 and 5.

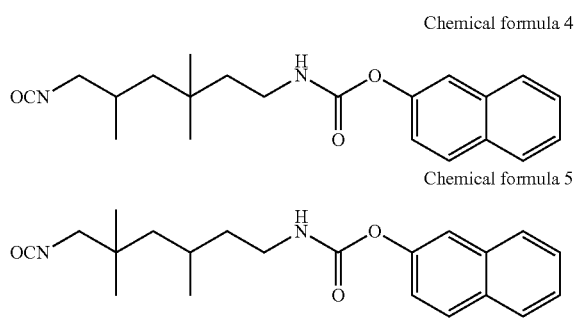

Chemical formula 4

Chemical formula 5

20.8 g (160 mmol) of 2-hydroxyethyl methacrylate was dissolved in 80 mL of methylethyl ketone and stirred at room temperature in argon atmosphere. Next, 0.03 g of dibutyl tin dilaurate was dripped to the solution and heated to 50 degrees C. under stirring. Thereafter, a solution in which 57.0 g of the reaction intermediate mixture represented by the Chemical formulae 4 and 5 was dissolved in 120 mL of methylethyl ketone was slowly dripped followed by stirring at 50 degrees C. for two hours. Next, the resultant was cooled down to room temperature to filter undissolved matter and the solvent was distilled away from the retrieved filtrate to obtain a crude paste. This paste was refined by silica gel column chromatography (methylene chloride/ethylene acetate=6/1) to obtain 49.7 g of the target monomer mixture of M-8 and M-9.

Synthesis Example 1: Synthesis of Copolymer CP-1

12.4 parts (172 mmol) of acrylic acid and 47.6 parts (108 mmol) of the monomer M-3 were dissolved in 420 mL of dried methylethyl ketone to prepare a monomer solution.

10 percent of the monomer solution was heated to 75 degrees C. in an argon atmosphere. Thereafter, a solution in which 2.3 parts of 2,2'-azobis(isobutylonitrile) (AIBN) and 0.2 parts of α-thioglycerol were dissolved in the rest (90 percent) of the monomer solution was dripped to the heated monomer solution in 2.5 hours followed by stirring at 75 degrees C. for six hours. The resultant was cooled down to room temperature and the thus-obtained reaction solution was charged to hexane. The precipitate was filtrated followed by drying with a reduced pressure to obtain 58.5 parts of Copolymer CP-1 (Mw: 22,000).

Synthesis Examples 2-18: Synthesis of Copolymers CP-2-CP-18

Copolymer CP-2 to Copolymer CP-18 were obtained in the same manner as in the synthesis of Copolymer CP-1 except that the monomer, the number of parts, and the polymerization temperature in the synthesis of Copolymer CP-1 were changed to Monomers M-3, M-5, M-8, and M-9, anionic monomers, other monomers, the number of parts, and the polymerization temperatures shown in each column of Synthesis Examples 2-18 of Table 1 and AIBN and thioglycerol serving as the chain transfer adjusting agent were used as shown in Table 1.

Mw and the produced amount of each copolymer are as shown in Table 1. AA and MAA in the column of anionic monomer in Table 1 respectively represent acrylic acid and methacrylic acid.

Preparation Example of Pigment Dispersion
Preparation of Pigment Dispersion PD-1

4.0 parts of copolymer CP-1 was dissolved in 80.0 parts of a pure water aqueous solution of tetraethyl ammonium hydroxide (TEAOH) in such a manner that pH was 8.0. 16.0 parts of carbon black (NIPEX150, manufactured by Degussa AG) was added to 84.0 parts of the aqueous solution of the thus-obtained copolymer followed by stirring for 12 hours.

The obtained mixture was subject to circulation dispersion at a peripheral speed of 10 m/s for one hour using a disk type bead mill (KDL type, media: zirconia ball having a diameter of 0.1 mm, manufactured by Shinmaru Enterprises Corporation) followed by filtration by a membrane filter having an opening diameter of 1.2 micro meter. Thereafter, pure water was added for adjustment to obtain 97.0 parts of a pigment dispersion element PD-1 (pigment solid portion concentration: 16 percent).

Preparation of Pigment Dispersion PD-2-PD-23

Pigment dispersion PD-2-PD-23 were obtained in the same manner as in the preparation of Pigment dispersion PD-1 except that the copolymer, the pH regulator, the kind and the content of the pigment, and the content of the pure water were changed as shown in each column of PD-2-PD-23 of Table 2.

TEAOH in Table 1 is tetraethyl ammonium hydroxide, NaOH is sodium hydroxide, and DEA is diethanol amine.

In addition, the color pigments used were as follows.

Pigment Blue 15:3: CHROMOFINE BLUE A-220JC, manufactured by Dainichiseika Color & Chemicals Mfg. Co., Ltd.

Pigment Red 122: Toner Magenta E002, manufactured by Clariant)

Pigment Yellow 74: Fast Yellow, manufactured by Dainichiseika Color & Chemicals Mfg. Co., Ltd.

Preparation Example of Ink

Preparation of Example 1: Ink GJ-1

40.0 parts of Pigment dispersion PD-1, 10.0 parts of glycerin, 20.0 parts of 1,3-butane diol, 1.0 part of 2-ethyl-1,3-hexane diol, 1.0 part of 2,2,4-trimethyl-1,3-pentane diol, 1.0 part of UNIDYNE™ DSN-403N (manufactured by DAIKIN INDUSTRIES, Ltd.), and 27.0 parts of pure water were mixed followed by stirring for one hour. The mixture was filtered by a membrane filter having an opening of 1.2 µm to obtain Ink GJ-1 of the present disclosure.

Preparation of Example 2-Example 23: Ink GJ-2-GJ-23

Ink GJ-2-GJ-23 were obtained in the same manner as in the preparation of Ink GJ-1 except that the pigment dispersion, the water-soluble solvent, and the kind and the content of the surfactant were changed as shown in each column of Example 2-Example 23 of Table 3.

Comparative Example 1: Preparation of Ink RGJ-1

1.20 g of acrylic acid and 7.12 g of the monomer represented by the following Chemical formula 6 were dissolved in 40 mL of dried methylethyl ketone to prepare a monomer solution. 10 percent of the monomer solution was heated to 75 degrees C. in an argon atmosphere. Thereafter, a solution in which 0.273 g of 2,2'-azobis(isobutylonitrile) was dissolved in the rest (90 percent) of the monomer solution was dripped to the heated monomer solution in 1.5 hours followed by stirring at 75 degrees C. for six hours. Subsequent to being cooled down to room temperature, the thus-obtained reaction solution was charged to hexane to precipitate a copolymer followed by filtration and drying under a reduced pressure to obtain 4.82 g of Copolymer RCP-1 (Mw: 7,500).

Chemical formula 6

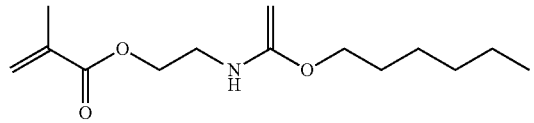

Thereafter, Pigment dispersion RPD-1 was obtained in the same manner as in the preparation of Pigment dispersion PD-1 of Example 1 except that the Comparative copolymer RCP-1 was used instead of the Copolymer CP-1.

Thereafter, Ink RGJ-1 was obtained in the same manner as in the preparation of the Ink GJ-1 of Example 1 except that the Pigment dispersion element RPD-1 was used instead of the Pigment dispersion PD-1.

Comparative Example 2: Preparation of Ink RGJ-2

Thereafter, Pigment dispersion RPD-2 was obtained in the same manner as in the preparation of Pigment dispersion PD-21 of Example 21 except that the Comparative copolymer RCP-1 was used instead of the Copolymer CP-1.

Thereafter, Ink RGJ-2 was obtained in the same manner as in the preparation of the Ink GJ-21 of Example 21 except that the Pigment dispersion RPD-2 was used instead of the Pigment dispersion PD-21.

Comparative Example 3: Preparation of Ink RGJ-3

Thereafter, Pigment dispersion RPD-3 was obtained in the same manner as in the preparation of Pigment dispersion PD-22 of Example 22 except that the Comparative copolymer RCP-1 was used instead of the Copolymer CP-1.

Thereafter, Ink RGJ-3 was obtained in the same manner as in the preparation of the Ink GJ-22 of Example 22 except that the Pigment dispersion RPD-3 was used instead of the Pigment dispersion PD-22.

Comparative Example 4: Preparation of Ink RGJ-4

Thereafter, Pigment dispersion RPD-4 was obtained in the same manner as in the preparation of Pigment dispersion PD-23 of Example 23 except that the Comparative copolymer RCP-1 was used instead of the Copolymer CP-1.

Thereafter, Ink RGJ-4 was obtained in the same manner as in the preparation of the Ink GJ-23 of Example 23 except that the Pigment dispersion RPD-4 was used instead of the Pigment dispersion PD-23.

Comparative Example 5: Preparation of Ink RGJ-5

80 g of 2-phenoxyethyl methacrylate as a monomer, 3.7 g of 3-mercapto-1-propanol as a chain transfer agent, and 0.3 g of 2,2-azobis(2,4-dimethyl valero nitrile) as an initiator were dissolved in 160 mL of tetrahydrofuran (THE) followed by heating to 65 degrees C. to conduct reaction in nitrogen atmosphere for seven hours. The thus-obtained solution was naturally cooled down and 80 mg of dibutyl tin (IV) dilaurate and a catalyst amount of hydroquinone were added thereto. Thereafter, 10.0 g of 2-methacryloyloxy ethylisocyanate was dripped. The resultant was heated to 50 degrees C. to conduct reaction for 2.5 hours. Thereafter, the resultant was re-precipitated by a solvent mixture of water and methanol for refinement to obtain 71 g of macromonomer MM-1 (mass average molecular weight (Mw): 4,000, number average molecular weight (Mn): 1,900).

Thereafter, 20 g of methylethylketone was heated to 75 degrees C. in nitrogen atmosphere. A solution in which 1.16 g of dimethyl-2,2'-azobis isobutylate, 9 g of the macromonomer MM-21, 1.8 g of p-styrene sulfonic acid, and 49.2 g of methylmethacrylate were dissolved in 40 g of methylethylketone was dripped to the heated methylethylketone in three hours. After the dripping, the reaction was caused to continue another hour.

Thereafter, a solution in which 0.6 g of methylethylketone was dissolved in 0.2 g of dimethyl-2,2'-azobisisobutylate was added and heated to 80 degrees C. and kept at 80 degrees C. for four hours under stirring. Furthermore, a solution in which 0.2 g of dimethyl-2,2'-azobis isobutylate was dissolved in 0.6 g of methylethylketone was added followed by stirring for six hours under heating. Subsequent to being cooled down, the thus-obtained reaction solution was charged to hexane to precipitate a graft polymer followed by filtration and drying to obtain Comparative copolymer RCP-2.

Thereafter, Pigment dispersion RPD-5 was obtained in the same manner as in the preparation of Pigment dispersion PD-1 except that the Comparative copolymer RCP-2 was used instead of the Copolymer CP-1.

Thereafter, Ink RGJ-5 was obtained in the same manner as in the preparation of the Ink GJ-1 except that the Pigment dispersion element RPD-5 was used instead of the Pigment dispersion element PD-1.

Comparative Example 6: Preparation of Ink RGJ-6

Synthesis of Monomer 72.0 g (500 mmol) of 2-naphthol and 125.0 g (1,000 mmol) of ethylene glycol mono-2-chloroethyl ether were dissolved in 500 mL of N-methyl-2-pyrrolidinone followed by stirring for one hour at room temperature. Moreover, the solution was stirred at 110 degrees C. for 10 hours and cooled down to room temperature. 2,500 mL of pure water was added to the thus-obtained reaction solution. Subsequent to one-hour stirring at room temperature, a precipitated solid material was filtered and dried with a reduced pressure.

70.0 g of the solid material obtained in the reaction specified above and 45.0 g (450 mmol) of triethylamine were dissolved in 250 mL of tetrahydrofuran followed by 30-minute stirring in ice bath. 36.6 g (350 mmol) of methacryloyl was slowly dripped followed by 3-hour stirring in ice bath. 250 mL of ethyl acetate and 100 mL of pure water were added to the thus-obtained solution for rinsing with water. Thereafter, the ethyl acetate layer was isolated followed by rinsing with saturated salt water. The ethyl acetate layer was isolated again followed by drying with magnesium sulfate and the solvent was distilled away. The remainder was refined by silica gel column chromatography to obtain 80.5 g of a monomer represented by the following Chemical formula 7.

Chemical formula 7

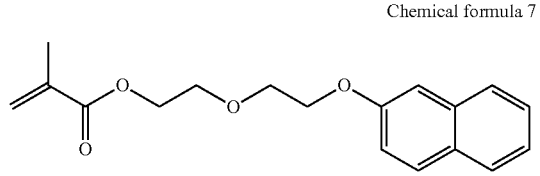 [SMILES: C=C(C)C(=O)OCCOCCOc1ccc2ccccc2c1]

Synthesis of Copolymer RCP-3

12.0 g of methylethylketone was placed in a flask equipped with a stirrer and a condenser and heated to 72 degrees C. in argon atmosphere. Thereafter, a solution in which 2.4 g (8.00 mmol) of the monomer represented by the Chemical formula 7, 1.2 g (13.9 mmol) of methacrylic acid, 8.4 g (47.6 mmol) of benzyl methacrylate, 0.128 g (0.56 mmol) of 2,2'-azobis(isobutyric acid)dimethyl were dissolved in 6.0 g of methylethyl ketone was dripped in three hours. After the dripping, the reaction was caused to continue for another hour. A solution in which 0.06 g (0.26 mmol) of 2,2'-azobis(isobutyric acid)dimethyl was dissolved in 2.0 g of methylethyl ketone was added and thereafter the system was heated to 78 degrees C. and stirred for four hours. Thereafter, re-precipitation was repeated twice using hexane. After refining a copolymer, the copolymer was filtered and dried with a reduced pressure to obtain 11.6 g of Copolymer RCP-3 (Mw: 34,000).

Preparation of Pigment Dispersion RPD-6

4.0 parts of the Copolymer RCP-3 was dissolved in a liquid mixture of 1.9 parts of 35 percent tetraethyl ammonium hydroxide, 50.0 parts of 3-methoxy-N,N'-dimethyl propinoneamide, and 28.1 parts of pure water.

16.0 parts of carbon black (NIPEX150, manufactured by Degussa AG) was added to 84.0 parts of the aqueous solution of the Copolymer RCP-3 followed by stirring for 12 hours. The thus-obtained mixture was subject to circulation dispersion at a peripheral speed of 10 m/s for one hour using a disk type bead mill (KDL type, media: zirconia ball having a diameter of 0.1 mm, manufactured by Shinmaru Enterprises Corporation) followed by filtration by a membrane filter having an opening diameter of 1.2 micro meter. Thereafter, pure water was added for adjustment to obtain 95.0 parts of a pigment dispersion RPD-6 (pigment solid portion concentration: 16 percent).

Preparation of Ink RGJ-6

40.0 parts of Pigment dispersion RPD-6, 10.0 parts of glycerin, 10.0 parts of 1,3-butane diol, 1.0 part of 2-ethyl-1,3-hexane diol, 1.0 part of 2,2,4-trimethyl-1,3-pentane diol, 1.0 part of UNIDYNE™ DSN-403N (solid portion: 100 percent, manufactured by DAIKIN INDUSTRIES, Ltd.), and 37.0 parts of pure water were mixed followed by stirring for one hour. The mixture was filtered by a membrane filter having an opening diameter of 1.2 μm to obtain Ink RGJ-6.

Storage stability of the pigment dispersions prepared in Examples and Comparative Examples were evaluated in the following manner.

Storage Stability of Pigment Dispersion

A glass container was filled with each pigment dispersion and stored at 70 degrees C. for two weeks. The change rate of the viscosity after the storage to the viscosity before the storage was obtained from the following relation and evaluated according to the following criteria. G (Good), A (Acceptable), and M (Marginal) are suitable in terms of practical use.

Viscosity was measured by a viscometer (RE80L, manufactured by TOKI SANGYO CO., LTD.) to measure viscosity of the ink at 25 degrees C. at 50 rotations.

Change rate of viscosity (percent)=[(Viscosity of pigment dispersion after storage−Viscosity of pigment dispersion before storage)/viscosity of pigment dispersion before storage}×100

Evaluation Criteria

G (Good): Change rate of viscosity within + or −5 percent

A (Acceptable): Change rate of viscosity within the range of from −8 percent to less than −5 percent and more than 5 percent to 8 percent M (Marginal): Change rate of viscosity within −10 percent to less than −8 percent and greater than 8 percent to 10 percent.

P (Poor): Change rate of viscosity within the range of from less than −10 percent to −30 percent and more than 10 percent to 30 percent I (Intolerable): Change rate of viscosity less than −30 percent or greater than 30 percent (gelated to the degree that evaluation was not possible)

Properties of the inks prepared in Examples and Comparative Examples were measured and evaluated in the following manner.

Storage Stability of Ink

An ink cartridge was filled with each ink and stored at 70 degrees C. for one week. The change rate of the viscosity after the storage to the viscosity before the storage was obtained from the following relation and evaluated according to the following criteria. G (Good), A (Acceptable), and M (Marginal) are suitable in terms of practical use.

Viscosity was measured by a viscometer (RESOL, manufactured by TOKI SANGYO CO., LTD.) to measure the viscosity of the ink at 25 degrees C. at 50 rotations.

The change rate of viscosity (percent)=[(Viscosity of ink after storage−viscosity of ink before storage)/viscosity of ink before storage]×100

Evaluation Criteria

G (Good): Change rate of viscosity within +5 percent or −5 percent

A (Acceptable): Change rate of viscosity within the range of from −8 percent to less than −5 percent and more than 5 to 8 percent M (Marginal): Change rate of viscosity within −10 percent to less than −8 percent and greater than 8 percent to 10 percent.

P (Poor): Change rate of viscosity within the range of from less than −10 percent to −30 percent and more than 10 percent to 30 percent I (Intolerable): Change rate of viscosity less than −30 percent or greater than 30 percent (gelated to the degree that evaluation was not possible)

Image Density

An inkjet printer (IPSiO GX5000) was filled with each ink at 23 degrees C. and 50 percent RH. A chart including general symbols of 64 point JIS X 0208 (1997), 2223 created by utilizing Microsoft Word 2000 (manufactured by Microsoft Corporation) was printed on plain paper 1 (Xerox 4200, manufactured by Xerox Corporation) and paper 2 (MyPaper, manufactured by Ricoh Company Ltd.). The symbol portion on image surface was measured by X-Rite 938 (manufactured by X-Rite Inc.) and evaluated according to the following criteria.

G (Good), A (Acceptable), and M (Marginal) are suitable for practical use.

The print mode used was: A modified mode in which "Plain Paper—Standard Fast" was modified to "No Color Calibration" from the user setting for plain paper by the driver installed onto the printer.

Incidentally, the symbols of JIS X 0208 (1997), 2223 include squares for the exterior with the inside thereof entirely painted with ink.

Evaluation Criteria

G (Good): 1.25 or higher

A (Acceptable): 1.20 to less than 1.25

M (Marginal): 1.10 to less than 1.20

P (Poor): Less than 1.10

I (Intolerable): pigment was gelated and not dispersed in ink, impossible to print symbols.

TABLE 1

| | | Chemical formula 2 | | Anionic monomer | | Monomer other than above | |
|---|---|---|---|---|---|---|---|
| | Copolymer | Kind | Part | Kind | Part | Kind | Part |
| Synthesis Example 1: | CP-1 | M-3 | 47.6 | AA | 12.4 | — | — |
| Synthesis Example 2: | CP-2 | M-5 | 45.4 | MAA | 14.6 | — | — |
| Synthesis Example 3: | CP-3 | M-8, M-9 | 42.8 | AA | 12.7 | Dodecyl methacrylate | 4.5 |
| Synthesis Example 4: | CP-4 | M-3 | 54.7 | AA | 5.3 | — | — |
| Synthesis Example 5: | CP-5 | M-3 | 53.9 | AA | 6.1 | — | — |
| Synthesis Example 6: | CP-6 | M-3 | 45.1 | MAA | 14.9 | — | — |
| Synthesis Example 7: | CP-7 | M-5 | 36.5 | AA | 21.9 | Styrene | 1.7 |
| Synthesis Example 8: | CP-8 | M-3 | 35.0 | AA | 25.0 | — | — |
| Synthesis Example 9: | CP-9 | M-3 | 47.6 | AA | 12.4 | — | — |
| Synthesis Example 10: | CP-10 | M-8, M-9 | 49.7 | AA | 10.3 | — | — |
| Synthesis Example 11: | CP-11 | M-3 | 40.4 | MAA | 19.6 | — | — |
| Synthesis Example 12: | CP-12 | M-5 | 47.9 | AA | 12.1 | — | — |
| Synthesis Example 13: | CP-13 | M-5 | 47.3 | AA | 12.7 | — | — |
| Synthesis Example 14: | CP-14 | M-3 | 36.3 | AA | 23.7 | — | — |
| Synthesis Example 15: | CP-15 | M-3 | 45.9 | AA | 12.0 | Styrene | 2.2 |
| Synthesis Example 16: | CP-16 | M-5 | 44.2 | AA | 8.4 | Dodecyl methacrylate | 7.4 |
| Synthesis Example 17: | CP-17 | M-8, M-9 | 52.2 | AA | 7.8 | — | — |
| Synthesis Example 18: | CP-18 | M-3 | 44.4 | MAA | 15.6 | — | — |

| | Polymerization Initiator AIBN Part | Chain transfer adjusting agent Thioglycerol Part | Polymerization temperature degrees C. | Chemical formula 2 Ratio Percent | Mw | Produced polymer Part |
|---|---|---|---|---|---|---|
| Synthesis Example 1: | 2.3 | 0.2 | 75 | 79.3 | 22000 | 58.5 |
| Synthesis Example 2: | 2.3 | 0.1 | 75 | 75.7 | 24100 | 57.4 |

TABLE 1-continued

| | | | | | | |
|---|---|---|---|---|---|---|
| Synthesis Example 3: | 2.3 | 0.2 | 75 | 71.3 | 21000 | 58.8 |
| Synthesis Example 4: | 2.3 | — | 75 | 91.1 | 26600 | 58.7 |
| Synthesis Example 5: | 1.5 | — | 70 | 89.8 | 43700 | 58.2 |
| Synthesis Example 6: | 2.3 | 0.3 | 75 | 75.1 | 19000 | 59.3 |
| Synthesis Example 7: | 2.3 | 0.3 | 75 | 60.8 | 19800 | 57.5 |
| Synthesis Example 8: | 2.3 | 0.3 | 75 | 58.3 | 18500 | 58.4 |
| Synthesis Example 9: | 0.8 | — | 70 | 79.3 | 54000 | 58.8 |
| Synthesis Example 10: | 1.4 | — | 70 | 82.8 | 48500 | 59.6 |
| Synthesis Example 11: | 1.5 | — | 75 | 67.3 | 39000 | 59.1 |
| Synthesis Example 12: | 3.9 | 0.5 | 75 | 79.8 | 16300 | 57.7 |
| Synthesis Example 13: | 4.3 | 0.8 | 75 | 78.8 | 5300 | 55.7 |
| Synthesis Example 14: | 5.0 | 1.2 | 75 | 60.6 | 4400 | 56.3 |
| Synthesis Example 15: | 2.3 | 0.1 | 75 | 76.5 | 25300 | 58.3 |
| Synthesis Example 16: | 3.5 | 0.5 | 75 | 73.7 | 12000 | 57.7 |
| Synthesis Example 17: | 3.5 | 0.8 | 75 | 87.1 | 8100 | 55.9 |
| Synthesis Example 18: | 1.9 | — | 75 | 74.1 | 36400 | 59.9 |

TABLE 2

| | | | Pure water + pH regulator | Kind of pigment | | | |
|---|---|---|---|---|---|---|---|
| Pigment dispersion | Copolymer | pH regulator | | Carbon Black | Pigment Blue 15:3 | Pigment Red 122 | Pigment Yellow 74 |
| PD-1 | CP-1 | 4.0 | TEAOH | 80.0 | 16.0 | | |
| PD-2 | CP-2 | 4.0 | TEAOH | 80.0 | 16.0 | | |
| PD-3 | CP-3 | 4.0 | TEAOH | 80.0 | 16.0 | | |
| PD-4 | CP-4 | 4.0 | TEAOH | 80.0 | 16.0 | | |
| PD-5 | CP-5 | 4.0 | TEAOH | 80.0 | 16.0 | | |
| PD-6 | CP-6 | 4.0 | NaOH | 80.0 | 16.0 | | |
| PD-7 | CP-7 | 4.0 | NaOH | 80.0 | 16.0 | | |
| PD-8 | CP-8 | 4.0 | TEAOH | 80.0 | 16.0 | | |
| PD-9 | CP-9 | 4.0 | TEAOH | 80.0 | 16.0 | | |
| PD-10 | CP-10 | 4.0 | TEAOH | 80.0 | 16.0 | | |
| PD-11 | CP-11 | 4.0 | DEA | 80.0 | 16.0 | | |
| PD-12 | CP-12 | 4.0 | TEAOH | 80.0 | 16.0 | | |
| PD-13 | CP-13 | 4.0 | TEAOH | 80.0 | 16.0 | | |
| PD-14 | CP-14 | 4.0 | TEAOH | 80.0 | 16.0 | | |
| PD-15 | CP-15 | 4.0 | TEAOH | 80.0 | 16.0 | | |
| PD-16 | CP-16 | 4.0 | TEAOH | 80.0 | 16.0 | | |
| PD-17 | CP-17 | 4.0 | NaOH | 80.0 | 16.0 | | |
| PD-18 | CP-18 | 4.0 | DEA | 80.0 | 16.0 | | |
| PD-19 | CP-1 | 1.6 | TEAOH | 82.4 | 16.0 | | |
| PD-20 | CP-1 | 10.0 | TEAOH | 74.0 | 16.0 | | |
| PD-21 | CP-1 | 6.0 | TEAOH | 74.0 | | 20.0 | |
| PD-22 | CP-1 | 6.0 | TEAOH | 74.0 | | | 20.0 |
| PD-23 | CP-1 | 6.0 | TEAOH | 74.0 | | | | 20.0 |

TABLE 3

| | Ink name | Pigment dispersion | |
|---|---|---|---|
| Example 1 | GJ-1 | PD-1 | 40.0 |
| Example 2 | GJ-2 | PD-2 | 40.0 |
| Example 3 | GJ-3 | PD-3 | 40.0 |
| Example 4 | GJ-4 | PD-4 | 40.0 |
| Example 5 | GJ-5 | PD-5 | 40.0 |
| Example 6 | GJ-6 | PD-6 | 40.0 |

TABLE 3-continued

| | | | |
|---|---|---|---|
| Example 7 | GJ-7 | PD-7 | 40.0 |
| Example 8 | GJ-8 | PD-8 | 40.0 |
| Example 9 | GJ-9 | PD-9 | 40.0 |
| Example 10 | GJ-10 | PD-10 | 40.0 |
| Example 11 | GJ-11 | PD-11 | 40.0 |
| Example 12 | GJ-12 | PD-12 | 40.0 |
| Example 13 | GJ-13 | PD-13 | 40.0 |
| Example 14 | GJ-14 | PD-14 | 40.0 |
| Example 15 | GJ-15 | PD-15 | 40.0 |
| Example 16 | GJ-16 | PD-16 | 40.0 |
| Example 17 | GJ-17 | PD-17 | 40.0 |
| Example 18 | GJ-18 | PD-18 | 40.0 |
| Example 19 | GJ-19 | PD-19 | 40.0 |
| Example 20 | GJ-20 | PD-20 | 40.0 |
| Example 21 | GJ-21 | PD-21 | 40.0 |
| Example 22 | GJ-22 | PD-22 | 40.0 |
| Example 23 | GJ-23 | PD-23 | 40.0 |

| | Water-Soluble Solvent | | | | | | | |
|---|---|---|---|---|---|---|---|---|
| | Glycerin | 1,3-butane diol | 3-methoxy-N,N-dimethyl propionamide | 3-ethyl-3-hydroxymethyl oxetane | Ethylene glycol monobutyl ether | 2-pyrroridone | 2-ethyl-1,3-hexanediol | 2,2,4-trimethyl-1,3-pentanediol |
| Example 1 | 10.0 | 20.0 | | | | | 1.0 | 1.0 |
| Example 2 | 10.0 | 10.0 | 20.0 | | | | 1.0 | 1.0 |
| Example 3 | 5.0 | 30.0 | | | | | 1.0 | 1.0 |
| Example 4 | 10.0 | | | 25.0 | | | | 1.0 |
| Example 5 | 5.0 | 10.0 | | 15.0 | 10.0 | | 1.0 | |
| Example 6 | 10.0 | 10.0 | 10.0 | | | | | 1.0 |
| Example 7 | 10.0 | 20.0 | | | | | 1.0 | 1.0 |
| Example 8 | 10.0 | | | | 10.0 | 10.0 | 1.0 | 1.0 |
| Example 9 | | 5.0 | | 40.0 | | | 1.0 | 1.0 |
| Example 10 | 5.0 | 30.0 | | | | | | 1.0 |
| Example 11 | 10.0 | | 30.0 | | | | 1.0 | 1.0 |
| Example 12 | 10.0 | 10.0 | 5.0 | 10.0 | | | | |
| Example 13 | | 5.0 | 20.0 | | | 10.0 | 1.0 | 1.0 |
| Example 14 | 10.0 | 20.0 | | | | | 1.0 | 1.0 |
| Example 15 | 10.0 | 10.0 | 10.0 | | | | | 1.0 |
| Example 16 | 5.0 | 10.0 | 15.0 | | | | | 1.0 |
| Example 17 | 10.0 | 10.0 | 10.0 | | | | 1.0 | 1.0 |
| Example 18 | 10.0 | 20.0 | | | | | 1.0 | 1.0 |
| Example 19 | 10.0 | | 20.0 | 20.0 | | | 1.0 | 1.0 |
| Example 20 | 10.0 | 10.0 | | 5.0 | | 5.0 | 1.0 | |
| Example 21 | | 30.0 | | | | | 1.0 | 1.0 |
| Example 22 | 10.0 | 20.0 | | 10.0 | | | 1.0 | 1.0 |
| Example 23 | 10.0 | 20.0 | | | | | 1.0 | 1.0 |

| | Surfactant UNIDYNE™ DSN-403N | Pure water |
|---|---|---|
| Example 1 | 1.0 | 27.0 |
| Example 2 | 1.0 | 17.0 |
| Example 3 | 1.0 | 22.0 |
| Example 4 | 2.0 | 22.0 |
| Example 5 | 1.0 | 18.0 |
| Example 6 | 1.0 | 28.0 |
| Example 7 | 2.0 | 26.0 |
| Example 8 | 1.0 | 27.0 |
| Example 9 | 1.0 | 12.0 |
| Example 10 | 1.0 | 23.0 |
| Example 11 | 2.0 | 16.0 |
| Example 12 | 1.0 | 24.0 |
| Example 13 | 1.0 | 22.0 |
| Example 14 | 1.0 | 27.0 |
| Example 15 | 2.0 | 27.0 |
| Example 16 | 1.0 | 28.0 |
| Example 17 | 1.0 | 27.0 |
| Example 18 | 1.0 | 27.0 |
| Example 19 | 1.0 | 7.0 |
| Example 20 | 2.0 | 27.0 |
| Example 21 | 1.0 | 27.0 |
| Example 22 | 1.0 | 17.0 |
| Example 23 | 1.0 | 27.0 |

TABLE 4

| | Pigment dispersion Storage stability | Ink storage stability | Plain paper 1 Image Density | Plain paper 2 Image Density |
|---|---|---|---|---|
| Example 1 | G | G | G | G |
| Example 2 | G | G | G | G |
| Example 3 | G | A | G | A |
| Example 4 | A | A | A | A |
| Example 5 | G | A | G | A |
| Example 6 | G | G | G | G |
| Example 7 | G | A | G | A |
| Example 8 | A | A | A | A |
| Example 9 | A | A | A | A |
| Example 10 | G | A | G | A |
| Example 11 | G | A | G | A |
| Example 12 | G | G | G | G |
| Example 13 | G | A | G | A |
| Example 14 | A | M | A | M |
| Example 15 | G | G | G | G |
| Example 16 | A | A | A | A |
| Example 17 | G | A | G | A |
| Example 18 | G | A | G | A |
| Example 19 | G | A | G | A |
| Example 20 | G | A | G | A |
| Example 21 | G | G | G | G |
| Example 22 | A | A | G | G |
| Example 23 | G | G | G | G |
| Comparative Example 1 | P | P | M | P |
| Comparative Example 2 | P | P | P | P |
| Comparative Example 3 | P | P | P | P |
| Comparative Example 4 | P | P | P | P |
| Comparative Example 5 | P | P | M | P |
| Comparative Example 6 | M | P | M | M |

As seen in the results, the pigment dispersions prepared by using the copolymers having a naphtyl group at their distal end of the side chain of Examples 1 to 23 related to the present disclosure have better storage stability than the pigment dispersions prepared by using the copolymers having no naphtyl group at their distal end of the side chain of Comparative Examples 1 to 5. The detailed mechanism is not clear but can be inferred as follows.

To achieve good pigment dispersion and dispersion stability, copolymer resins are firmly adsorbed and re-agglomeration of pigment particles is prevented due to steric barrier of the resins between pigment particles at the same time.

The copolymer related to the present disclosure is inferred to have excellent property with regard to the above-mentioned. In aqueous ink, adsorption of a copolymer resin and a pigment is caused by mutual attraction due to hydrophobic mutual interaction and aromatic stacking mutual interaction (π-π mutual interaction). The copolymer related to the present disclosure includes the structure unit represented by the Chemical formula 1 serving as hydrophobic part and the structure unit including an anionic group serving as hydrophilic part. Due to strong hydrophilicity by the anionic part, it is possible to include the structure unit represented by the Chemical formula 1 in a high concentration while securing aqueous property so that great hydrophobic mutual interaction is demonstrated. In addition, the hydrophobic part has a naphtyl group so that a great π-π mutual interaction is obtained. Due to these combination, the copolymer resin is strongly adsorbed to the pigment. Moreover, the copolymer resin related to the present disclosure is inferred that, due to its structural feature, it is possible to continue holding repulsion between pigment particles due to steric barrier and electrostatic repulsion.

In addition, if a structure unit similar to the structure unit represented by the Chemical formula 1 in terms of having a naphtyl group at its distal end of the side chain but different therefrom is used, storage stability of ink is not sufficient so that securing stable quality for an extended period of time is not easy (Refer to Comparative Example 6).

Moreover, image forming, recording, printing, modeling, etc. in the present disclosure represent the same meaning.

Having now fully described embodiments of the present invention, it will be apparent to one of ordinary skill in the art that many changes and modifications can be made thereto without departing from the spirit and scope of embodiments of the invention as set forth herein.

What is claimed is:

1. Ink comprising:
   water;
   a coloring material; and
   a copolymer including a first structure unit represented by the following Chemical formula 1 and a second structure unit including an anionic group, Chemical formula 1

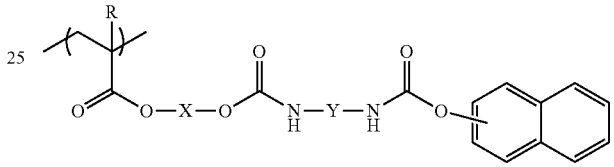

where R represents a hydrogen atom or a methyl group, X represents an alkylene group having 2-4 carbon atoms, and Y represents a substituted or non-substituted straight-chain alkylene group having 5 to 7 carbon atoms.

2. The ink according to claim 1, wherein the second structure unit includes a carboxylic group.

3. The ink according to claim 1, wherein a proportion of the first structure unit in the copolymer is 75 percent by mass-90 percent by mass.

4. The ink according to claim 1, wherein a mass average molecular weight of the copolymer is 15,000-40,000.

5. A method of manufacturing ink including water, a coloring material, and a copolymer, comprising:
   synthesizing the copolymer by radical polymerization of a monomer mixture including a monomer represented by the following Chemical formula 2 and a monomer including an anionic group, Chemical formula 2

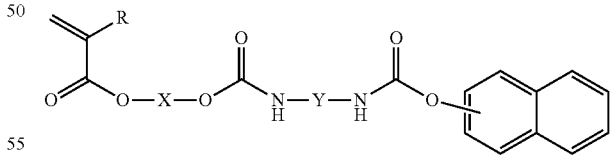

where R represents a hydrogen atom or a methyl group, X represents an alkylene group having 2-4 carbon atoms, and Y represents a substituted or non-substituted straight-chain alkylene group having 5 to 7 carbon atoms; and
mixing the copolymer, the coloring material, and the water.

6. An ink cartridge comprising:
   the ink of claim 1; and
   a container to accommodate the ink of claim 1.

* * * * *